(12) United States Patent
Dzurino et al.

(10) Patent No.: US 12,429,017 B2
(45) Date of Patent: *Sep. 30, 2025

(54) AIR SHUT-OFF VALVE FOR AN ENGINE

(71) Applicant: DeltaHawk Engines, Inc., Racine, WI (US)

(72) Inventors: Elijah John Dzurino, Racine, WI (US); Alexander Joeseph Boho, Waterford, WI (US)

(73) Assignee: DeltaHawk Engines, Inc., Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/792,283

(22) Filed: Aug. 1, 2024

(65) Prior Publication Data

US 2025/0230785 A1    Jul. 17, 2025

Related U.S. Application Data

(63) Continuation of application No. 18/410,653, filed on Jan. 11, 2024, now Pat. No. 12,085,048.

(51) Int. Cl.
| | |
|---|---|
| *F02M 35/10* | (2006.01) |
| *F16K 1/22* | (2006.01) |
| *F02M 35/116* | (2006.01) |
| *F16K 31/10* | (2006.01) |

(52) U.S. Cl.
CPC ....... *F02M 35/10255* (2013.01); *F16K 1/221* (2013.01); *F02M 35/116* (2013.01); *F16K 31/105* (2013.01)

(58) Field of Classification Search
CPC .......... F02M 35/10255; F02M 35/116; F02M 35/1027; F16K 1/221; F16K 31/105; F16K 3/00; F16K 3/025; F16K 1/224; F16K 1/226; F16K 31/0281; F16K 3/0254
See application file for complete search history.

(56) References Cited

U.S. PATENT DOCUMENTS

| | | | | |
|---|---|---|---|---|
| 5,671,708 | A * | 9/1997 | Ichinose | F02D 9/02 |
| | | | | 123/184.54 |
| 2013/0000730 | A1 * | 1/2013 | Johnson | F02D 9/02 |
| | | | | 137/551 |
| 2013/0068984 | A1 * | 3/2013 | Molavi | F16K 3/06 |
| | | | | 251/336 |
| 2020/0386322 | A1 * | 12/2020 | Lawrence | F02D 9/1065 |

* cited by examiner

*Primary Examiner* — Syed O Hasan
(74) *Attorney, Agent, or Firm* — Reinhart Boerner Van Deuren s.c.

(57) ABSTRACT

An air-shut off valve for an engine is provided to reduce the number of engine cycles that occur if an engine starts in reverse. The air shut-off valve includes a shaft centered on and extending along a longitudinal axis and a valve plate centered on a central axis. The valve plate is mounted on the shaft and positioned such that the central axis and the longitudinal axis do not intersect with each other. The valve plate can be actuated automatically (i.e., through air interfacing with the valve plate) or manually (i.e., by a user) between an opened position and a closed position with respect to the air intake tube.

20 Claims, 23 Drawing Sheets

AIR SHUT-OFF VALVE FOR AN ENGINE

CROSS-REFERENCE TO RELATED PATENT APPLICATION

This application is a continuation of U.S. application Ser. No. 18/410,653, filed Jan. 11, 2024, which is incorporated herein by reference in its entirety.

BACKGROUND OF THE INVENTION

The present invention relates generally to the field of engines. The present invention relates specifically to an air shut-off valve that can be automatically and/or manually actuated to reduce fluid communication for air in an engine, such as a compression ignition engine.

SUMMARY OF THE INVENTION

One embodiment of the invention relates to an air intake system for a compression ignition engine. The air intake system includes an air intake tub, a shaft, and a valve plate. The air intake tube has a body that is centered on and extends along an intake axis. The air intake tube also had a first opening on the body and a second opening on the body opposite the first opening along the intake axis. The second opening is configured to couple to the engine such that, when the engine is operating, air may flow in a first direction from the first opening through the second opening and into the engine. The shaft is centered on and extends along a longitudinal axis and extends through the body of the air intake tube. The valve plate is mounted on the shaft and positioned within the body between the first opening and the second opening.

The valve plate is configured to actuate between an opened position and a closed position with respect to the air intake tube. When air flows through the air intake tube in the first direction (i.e., from first opening to second opening towards the engine), more air interfaces with a first section of valve plate than a second section of valve plate to bias the valve plate into the opened position. When air flows through the air intake tube in a second direction opposite to the first direction (i.e., from second opening to first opening away from the engine), more air interfaces with a third section of the valve plate than a fourth section to bias the valve plate into the closed position. As such, when the valve plate is in the opened position, the valve plate provides greater fluid communication for air between the first opening and the second opening, than when the valve plate is in the closed position.

Another embodiment of the invention relates to an air shut-off valve for an engine. The air shut-off valve includes a shaft extending along a longitudinal axis and a valve plate centered on a central axis. The shaft includes a first section and a second section rotatably coupled to the first section. The first section of the shaft has a key, and the second section of the shaft has a keyway. The valve plate is mounted on the second section of the shaft. The valve plate is positioned such that the central axis and the longitudinal axis of the shaft do not intersect with each other. The valve plate is configured to actuate between an opened position and a closed position. When the valve plate is in the opened position, the second section of the shaft can rotate with respect to the first section around the longitudinal axis at least 70 degrees. When the valve plate is in the closed position, the key engages the keyway retaining the valve plate in the closed position.

Another embodiment of the invention relates to an air shut-off valve for an engine. The air shut-off valve includes a housing, a shaft extending along a longitudinal axis a biasing element, and a valve plate centered on a central axis. The shaft includes a first section positioned within the housing and a second section extending away from the first section and the housing. An arm is coupled to the first section. The biasing element is located within the housing and engages with the arm and an inner wall of the housing. A valve plate us mounted on the second section of the shaft and is positioned such that the central axis and the longitudinal axis of the shaft do not intersect with each other. The valve plate is configured to actuate between an opened position and a closed position by rotating around the longitudinal axis. When the valve plate is not actuated, the biasing element biases the valve plate towards the opened position.

Additional features and advantages will be set forth in the detailed description which follows and will be readily apparent to those skilled in the art from the description or recognized by practicing the embodiments as described in the written description and/or shown in the accompany drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments. In addition, alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of an air shut-off valve for an engine are shown. Engines, such as compression ignition engines, may run in reverse such that air is pulled into the engine through the exhaust, causing any combustion gas generated to exit the engine through the intake. Running in reverse can cause unnecessary strain on the engine which may reduce the engines performance, efficiency, and life.

Applicant has developed various air shut-off valves for engines that are believed to provide various advantages. Specifically, the air shut-off valves discussed herein include a valve plate mounted on a shaft. The valve plate is positioned such that a central axis of the valve plate and a longitudinal axis of the shaft do not intersect with each other. In this way, the air shut-off valve can be actuated automatically (i.e., through air interfacing with the valve plate) or manually (i.e., by a user). As such, Applicant believes that one or more of the air shut-off valves described herein reduce reverse air flow through an engine and reduces the number of engine cycles that occur if an engine begins to run in reverse.

Figure 1:
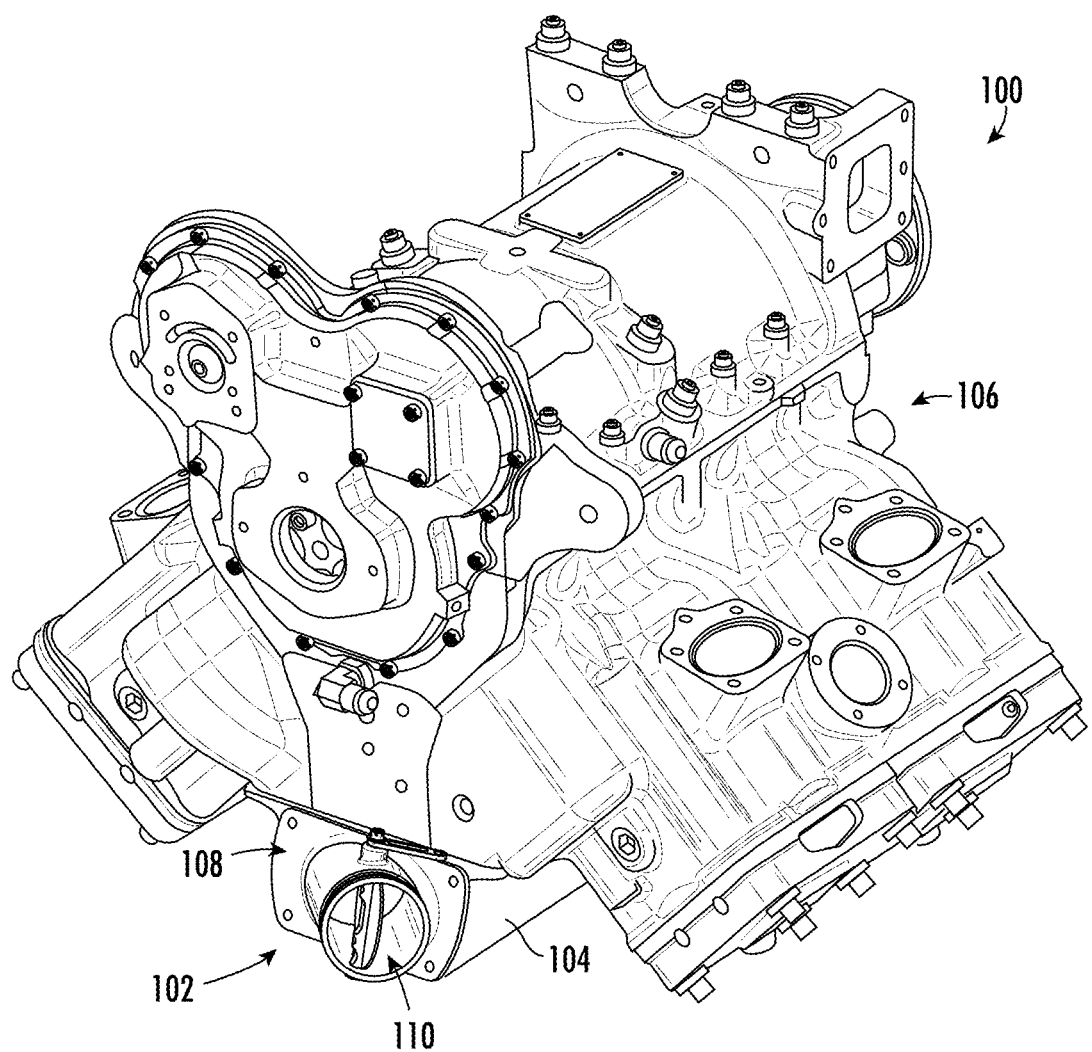
FIG. 1 is a front perspective view of an engine with an air shut-off valve mounted in the air intake tube, according to an exemplary embodiment.
Figure 2:
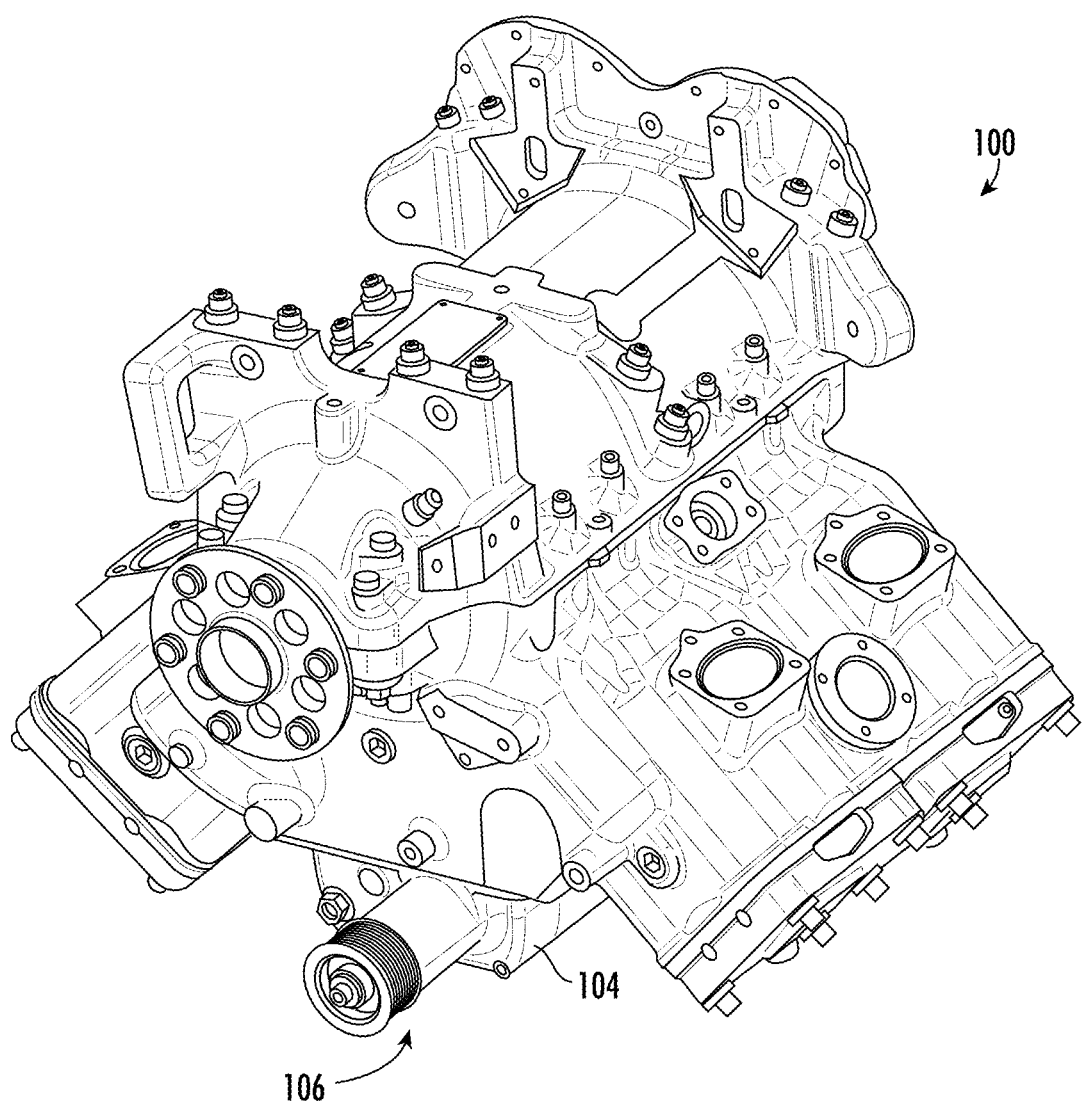
FIG. 2 is a rear perspective view of the engine of FIG. 1, according to an exemplary embodiment.

Referring to FIGS. 1 and 2, an engine 100 is shown according to an exemplary embodiment. As shown, engine 100 is a compression ignition engine and, more specifically, a two-stroke diesel engine that is oriented in an inverted V-block configuration. Engine 100 includes an air intake system 102 mounted on an intake manifold 104 and an air exhaust system 106. Air typically enters engine 100 in a first direction flowing from intake system 102 to exhaust system 106. However, if engine 100 runs in reverse, air will flow through engine 100 in a second direction opposite the first direction (i.e., from exhaust system 106 to intake system 102).

As shown in FIG. 1, an air shut-off valve 110 is provided in air intake system 102 in order to reduce air flow through engine 100 in the second direction. Though discussed namely in the context of engine 100, the air shut-off valves discussed herein are further applicable to other compression ignition engines. Air shut-off valve 110 may be manually or automatically actuated which allows for it to efficiently engage when air begins to flow through engine 100 in the second direction. In certain embodiments, air shut-off valve 110 may be mounted in exhaust system 106. When mounted in exhaust system 106, air shut-off valve may actuate into the closed position when air flows through the engine in the second direction.

Referring to FIGS. 3-8, air intake system 102 with air shut-off valve 110 is shown and described. Specifically, air intake system 102 includes an intake tube 108 and air shut-off valve 110. Air intake tube 108 has a body 112 with a first end 114 and a second end 116 opposite the first end 114. Body 112 has a hollow interior and is configured for fluid communication of air from first end 114 to second end 116. Body 112 includes an inner surface 113 and an outer surface 115.

As shown, body 112 is a cylindrical shape and extends along an intake axis 122. Body 112 has a first opening 118 on first end 114 and a second opening 120 on second end 116. First opening 118 and second opening 120 are aligned along intake axis 122 such that each opening 118, 120 is centered along intake axis 122. Second end 116 is configured to couple to intake manifold 104 of engine 100. When second end 116 is coupled to intake manifold 104, second opening 120 is aligned with an opening on intake manifold 104 allowing air to flow in a first direction 121 from the first opening 118, through the second opening 120, and into engine 100. If engine 100 starts in reverse, then air may flow in a second direction 123 opposite first direction 121 from second opening 120 to first opening 118.

Air shut-off valve 110 is mounted in intake tube 108. Air shut-off valve 110 includes a shaft 124 and a valve plate 126. Shaft 124 is centered on and extends along a longitudinal axis 125. Shaft 124 is positioned off-center on body 112 such that longitudinal axis 125 does not intersect with intake axis 122.

Shaft 124 extends through body 112 of air intake tube 108. That is, shaft 124 extends from a first side of body 112 to a second side of body 112. More specifically, shaft 124 passes through outer surface 115 of body 112 in two places. In certain embodiments, shaft 124 may extend partially into air intake tube 108, rather than entirely through air intake tube 108. As shown, air intake tube 108 includes projections 128 which extend away from outer surface 115 of body 112. Projections 128 surround and retain shaft 124.

Valve plate 126 is mounted on shaft 124. Specifically, valve plate is coupled to shaft 124 with two fasteners, shown as bolts 130. Valve plate 126 is located within intake tube 108 and is positioned between first opening 118 and second opening 120.

Valve plate 126 is centered on a central axis 127. Valve plate 126 is positioned on shaft 124 such that longitudinal axis 125 and central axis 127 are skew to each other. That is, longitudinal axis 125 and central axis 127 are not parallel and do not intersect with each other.

As shown, valve plate 126 has a circular shape and is configured to be able to actuate between an opened position and a closed position with respect to intake tube 108. Specifically, valve plate 126 rotates around longitudinal axis 125 between the opened position and the closed position. Central axis 127 remains skew to longitudinal axis 125 regardless of the rotational positioning of valve plate 126 around longitudinal axis 125. As such, central axis 127 is never parallel to longitudinal axis 125, and central axis 127 never intersects longitudinal axis 125.

As shown, central axis 127 intersects with intake axis 122. In certain embodiments, when valve plate 126 is in the opened position, central axis 127 and intake axis 122 are perpendicular. In other certain embodiments, when valve plate 126 is in the closed position, central axis 127 and intake axis 122 are parallel, and more specifically, are colinear.

It is believed that positioning shaft 124 off-center to body 112 of intake tube 108 and positioning longitudinal axis 125 skew to central axis 127 of valve plate 126 allows for valve plate 126 to be actuated automatically. That is, as air flows through intake tube 108 in first direction 121 or second direction 123, the air generates additional force on a section of valve plate 126, which biases valve plate 126 around longitudinal axis 125.

Specifically, valve plate 126 is divided into four sections by longitudinal axis 125. On a front surface 132 of valve plate 126, valve plate 126 includes a first section 195 on one side of longitudinal axis 125 and a second section 196 located on the opposite side of longitudinal axis 125 from first section 195. On a back surface 133 of valve plate 126, valve plate 126 includes a third section 197 on one side of longitudinal axis 125. As shown, third section 197 is substantially the same size as first section 195 and is positioned opposite from first section 195. A fourth section 198 is located on back surface 133 of valve plate 126 and is located on the opposite side of longitudinal axis 125 from third section 197. As shown, fourth section 198 is substantially the same size as second section 196 and is positioned opposite from second section 196.

In this way, valve plate 126 is biased into the opened position by air when air flows through intake tube 108 in first direction 121 because more air interfaces with first section 195 of valve plate 126 than on second section 196. Similarly, valve plate 126 is biased into the closed position by air when air flows through intake tube 108 in second direction 123 because more air interfaces with third section 197 of valve plate 126 than on fourth section 198.

Figure 3:
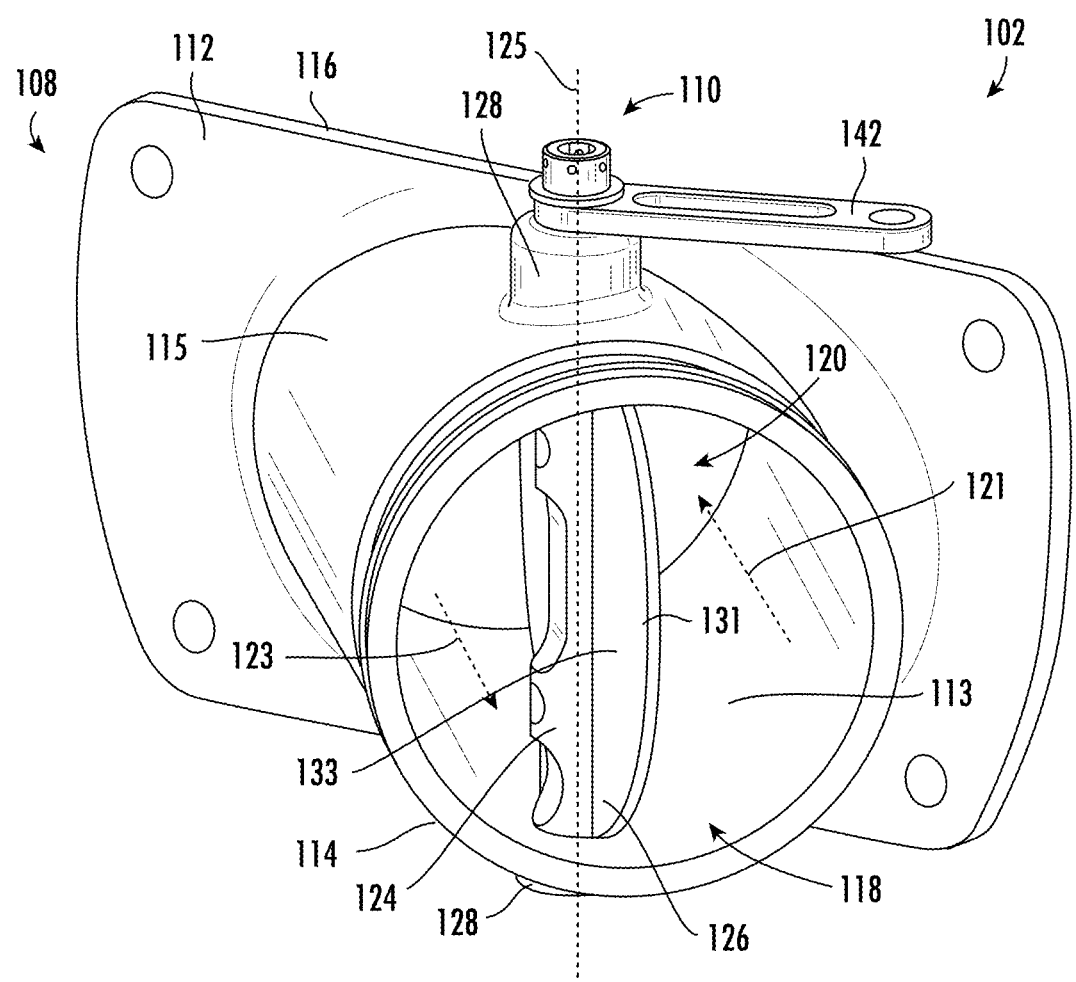
FIG. 3 is a front perspective view of the air intake tube of FIG. 1 with the air shut-off valve in the opened position, according to an exemplary embodiment.
Figure 4:
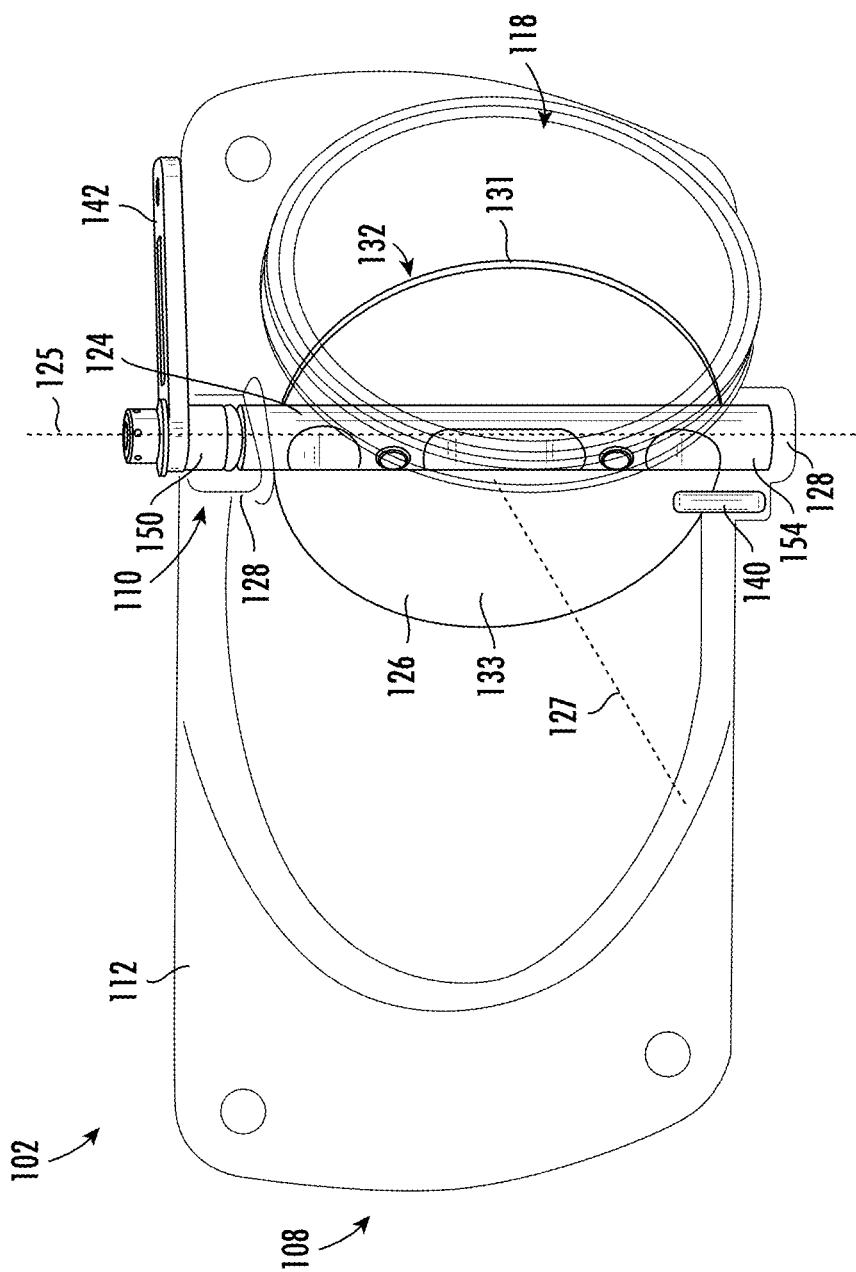
FIG. 4 is a front plan view of the air intake tube of FIG. 1 with a transparent body and the air shut-off valve in the opened position, according to an exemplary embodiment.
Figure 5:
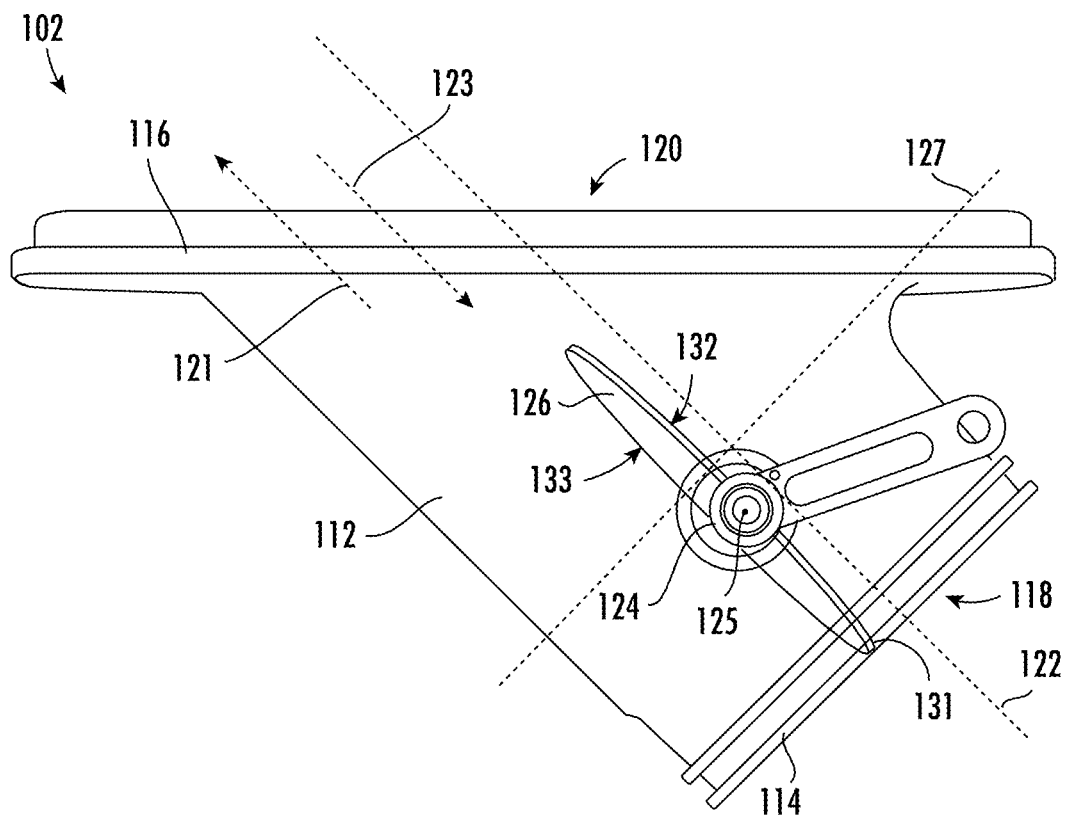
FIG. 5 is a top plan view of the air intake tube of FIG. 1 with a transparent body and the air shut-off valve in the opened position, according to an exemplary embodiment.

As shown in FIGS. 3-5, valve plate 126 is in the opened position. When air flows through air intake tube 108 in first direction 121 (i.e., from first opening 118 to second opening 120), air interfaces with valve plate 126 to bias valve plate 126 into the opened position. In the opened position, valve plate 126 is positioned such that a portion of an outer edge 131 of valve plate 126 is located closest to first opening 118.

Figure 6:
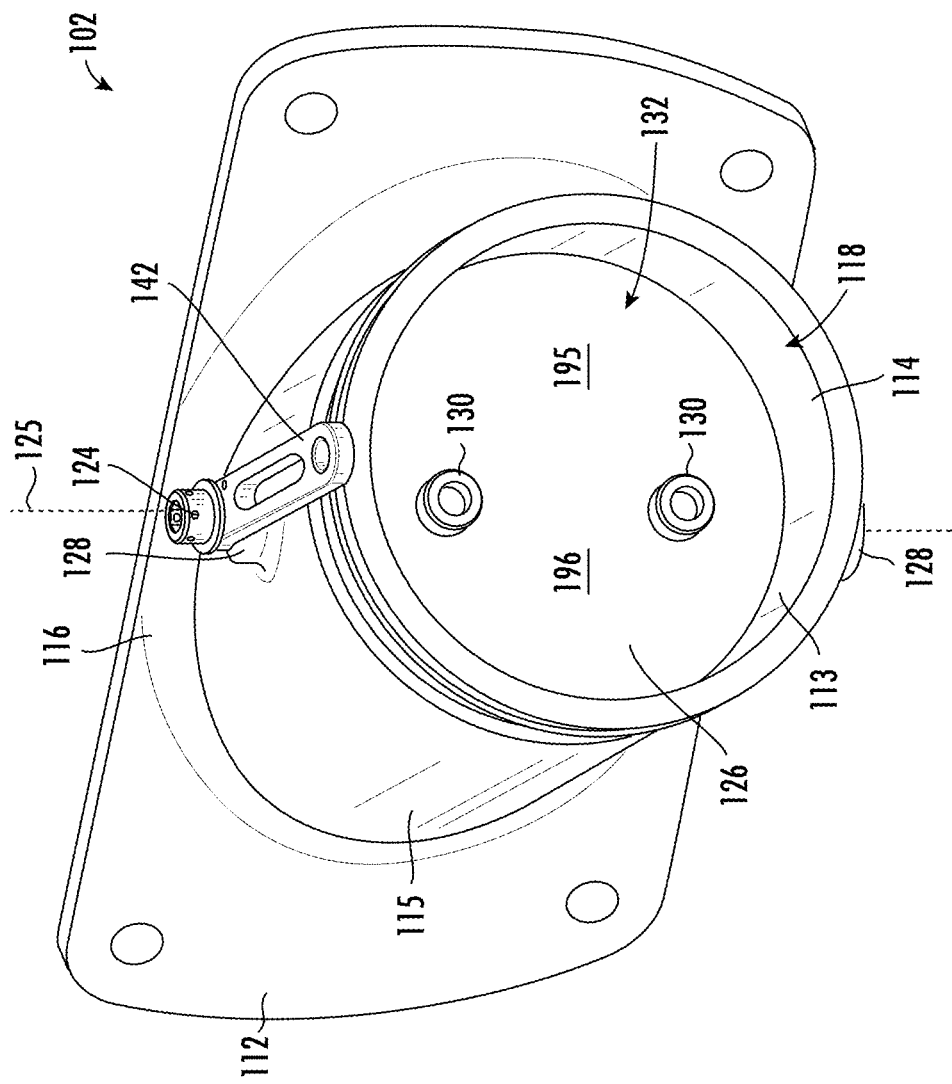
FIG. 6 is a front perspective view of the air intake tube of FIG. 1 with the air shut-off valve in the closed position, according to an exemplary embodiment.
Figure 7:
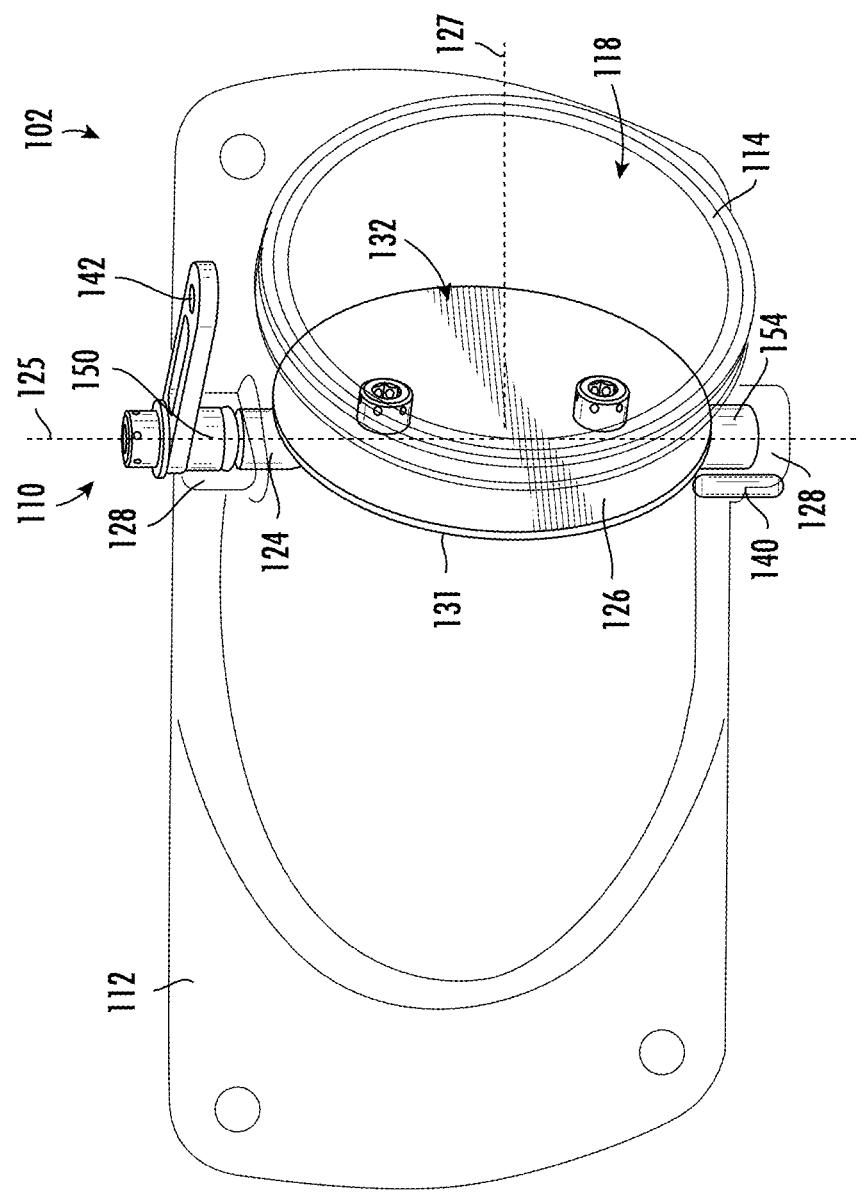
FIG. 7 is a front plan view of the air intake tube of FIG. 1 with a transparent body and the air shut-off valve in the closed position, according to an exemplary embodiment.
Figure 8:
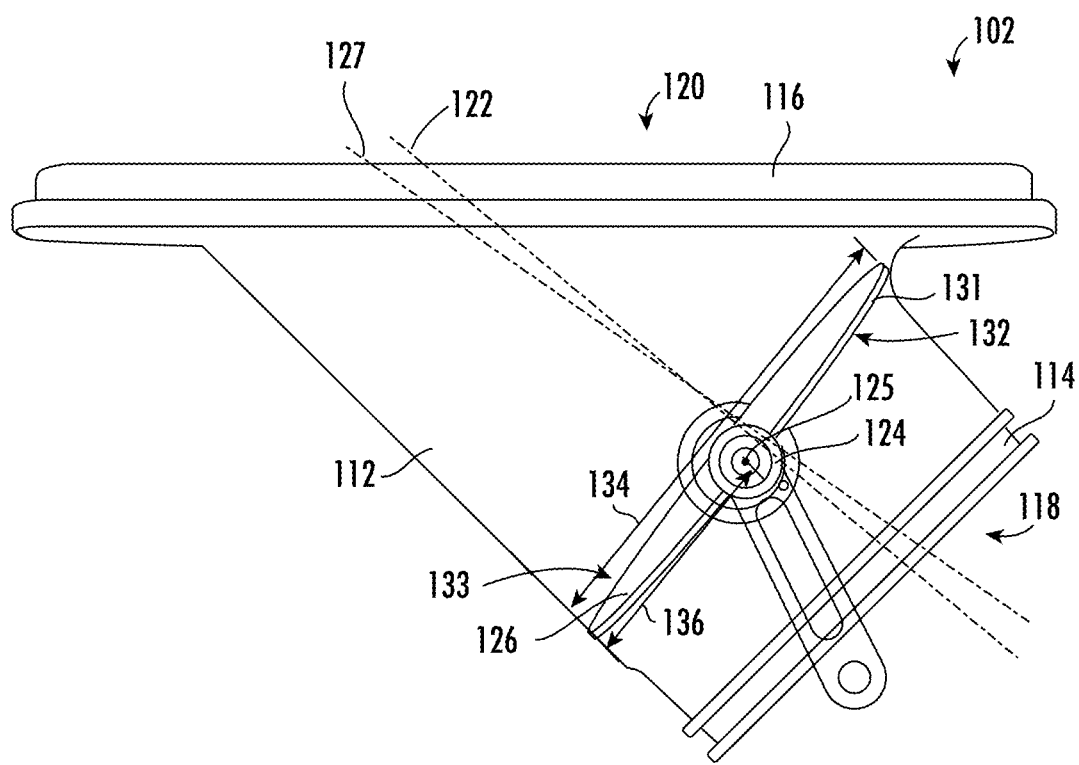
FIG. 8 is a top plan view of the air intake tube of FIG. 1 with a transparent body and the air shut-off valve in the closed position, according to an exemplary embodiment.

As shown in FIGS. 6-8, valve plate 126 is in the closed position. When air flows through air intake tube 108 in second direction 123 opposite first direction 121 (i.e., from second opening 120 to first opening 118), then the air interfaces with valve plate 126 to bias valve plate 126 into the closed position. In the closed position, valve plate 126 is positioned such that a portion of a front surface 132 of valve plate 126 is located closest to the first opening. Outer edge 131 is positioned adjacent to inner surface 113 of body 112. Outer edge 131 may abut and interface with inner surface 113. As such, the opened position provides greater fluid communication for air between first opening 118 and second opening 120 than the closed position.

In certain embodiments, valve plate 126 rotates at least 65 degrees around longitudinal axis 125 between the opened position and the closed position. In other certain embodiments, valve plate 126 rotates less than 90 degrees around longitudinal axis 125 between the opened position and the closed position. In certain embodiments, valve plate 126 rotates at most 82.5 degrees. In a specific embodiment, valve plate rotates between 65 degrees and 82.5 degrees and, more specifically, rotates between 70 degrees and 75 degrees. In another specific embodiment, valve plate 126 rotates between 86 degrees and 88 degrees.

Figure 9:
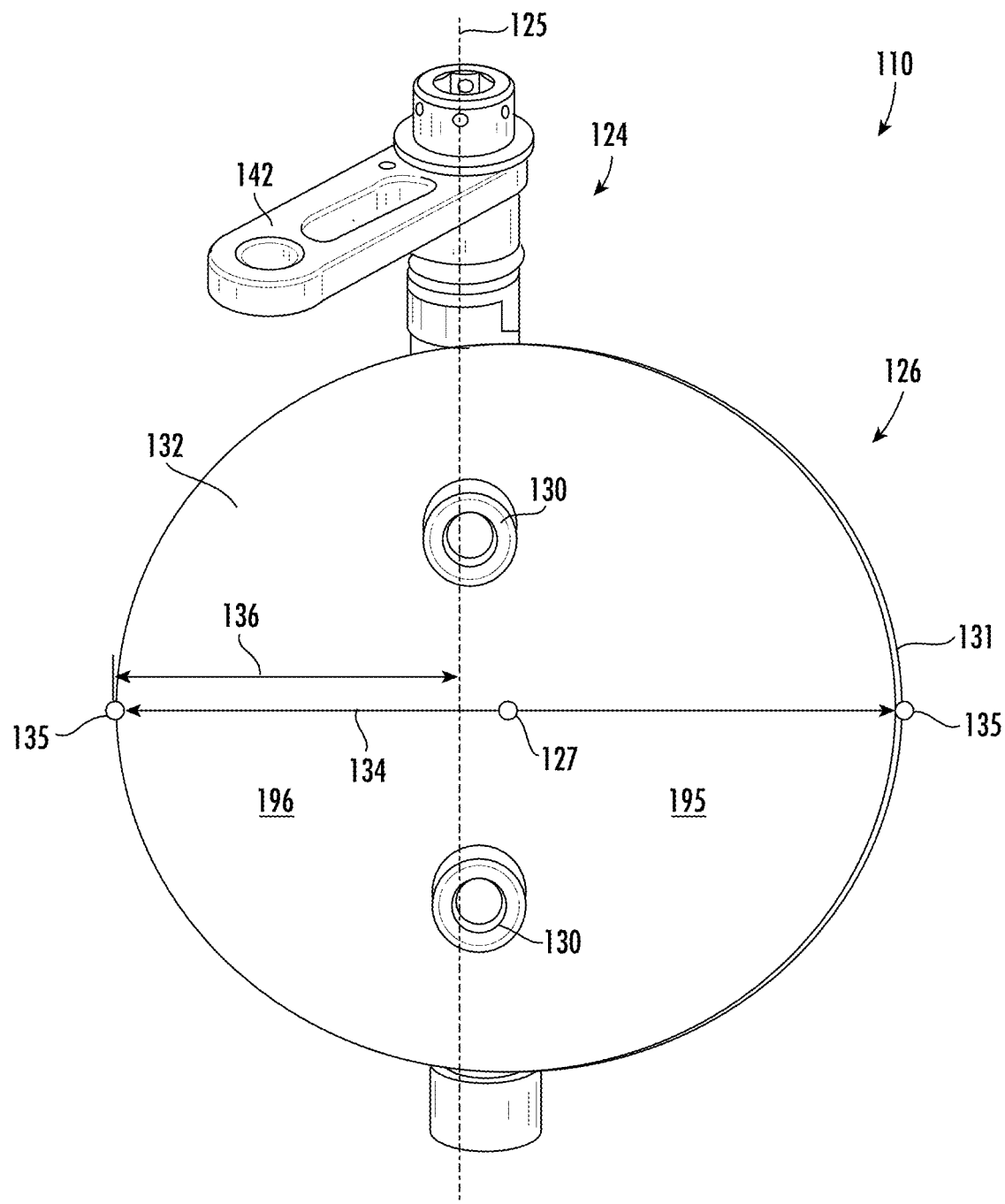
FIG. 9 is a front plan view of the air shut-off valve of FIG. 1, according to an exemplary embodiment.
Figure 10:
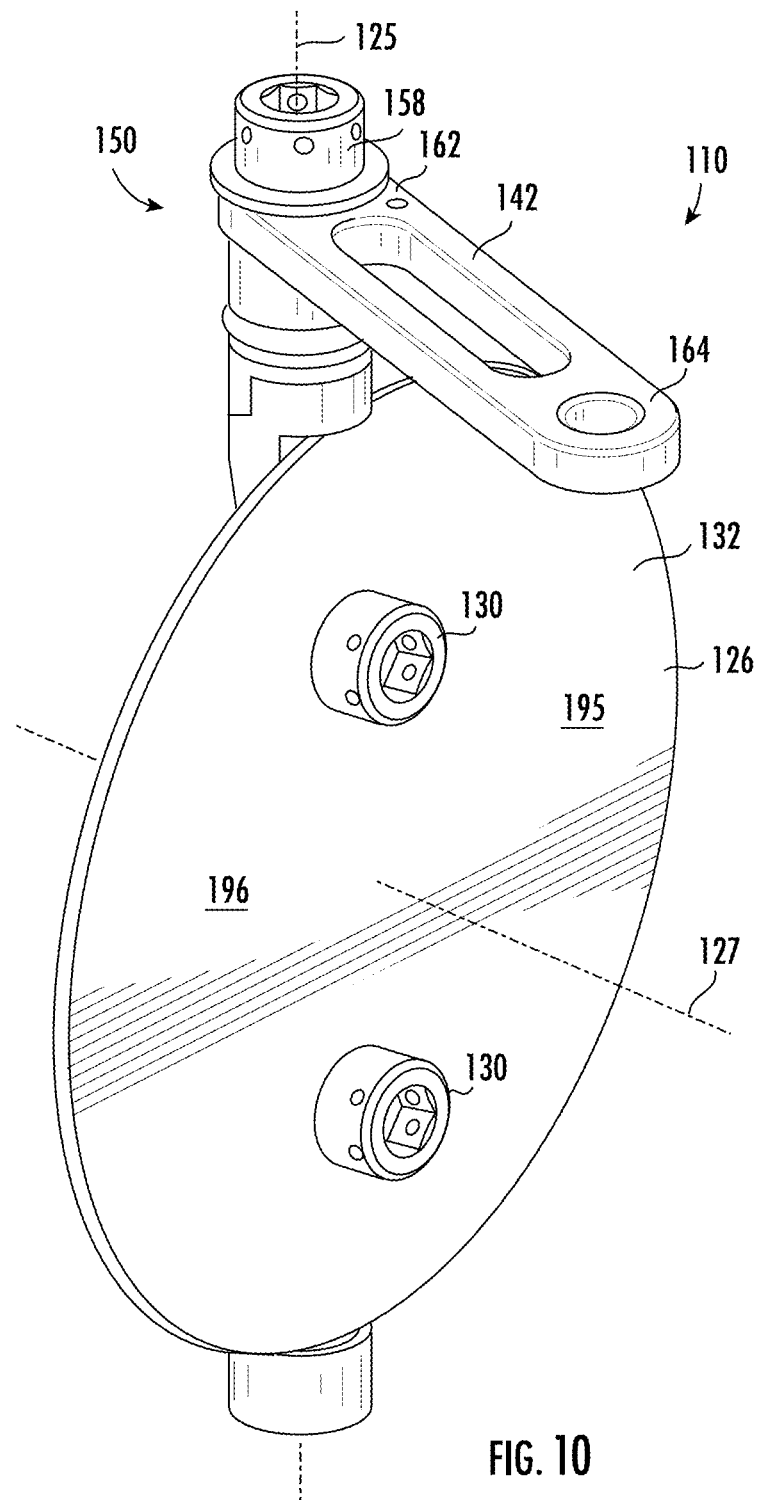
FIG. 10 is a front perspective view of the air shut-off valve of FIG. 9, according to an exemplary embodiment.
Figure 11:
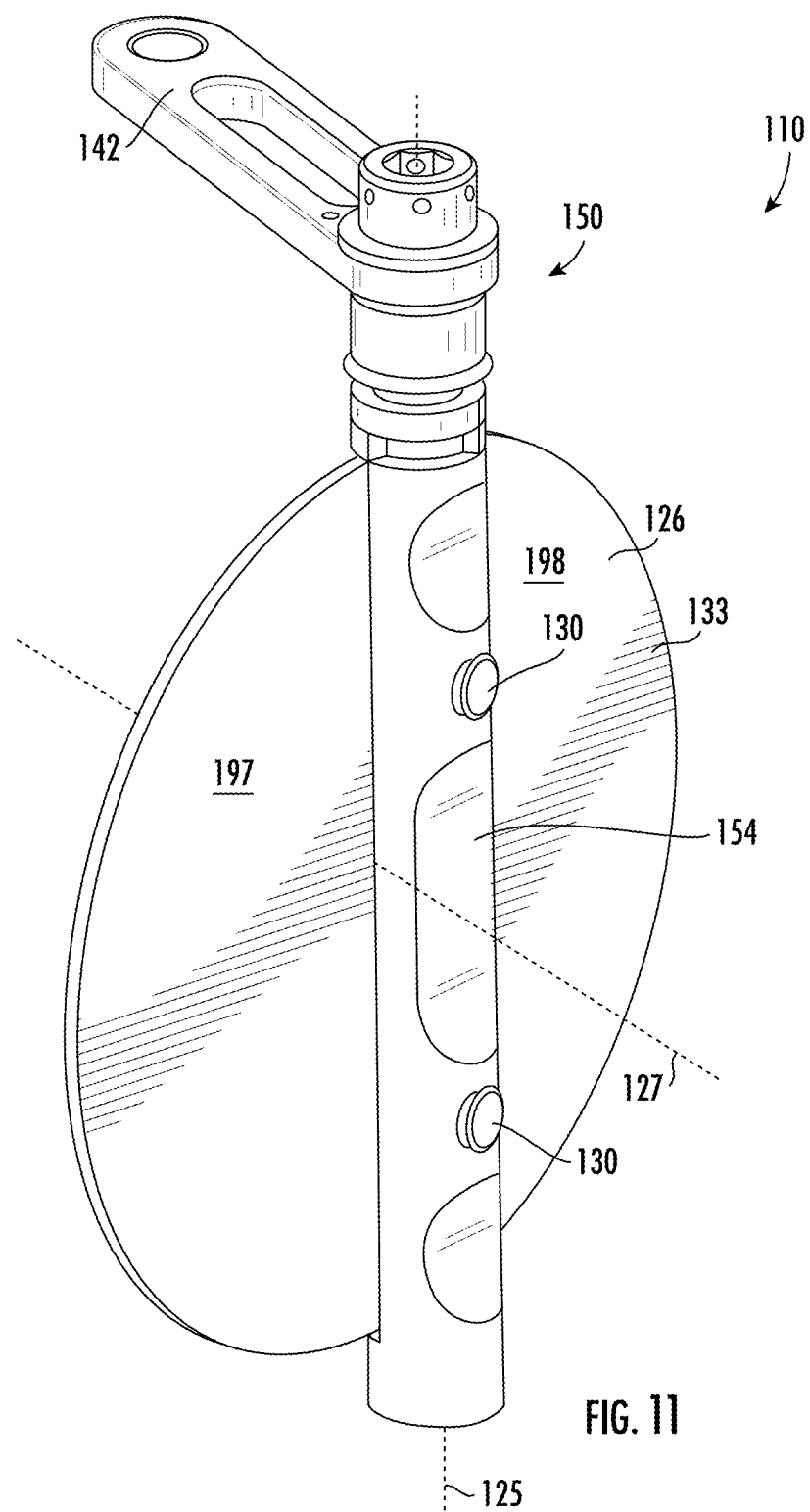
FIG. 11 is a rear perspective view of the air shut-off valve of FIG. 9, according to an exemplary embodiment.
Figure 12:
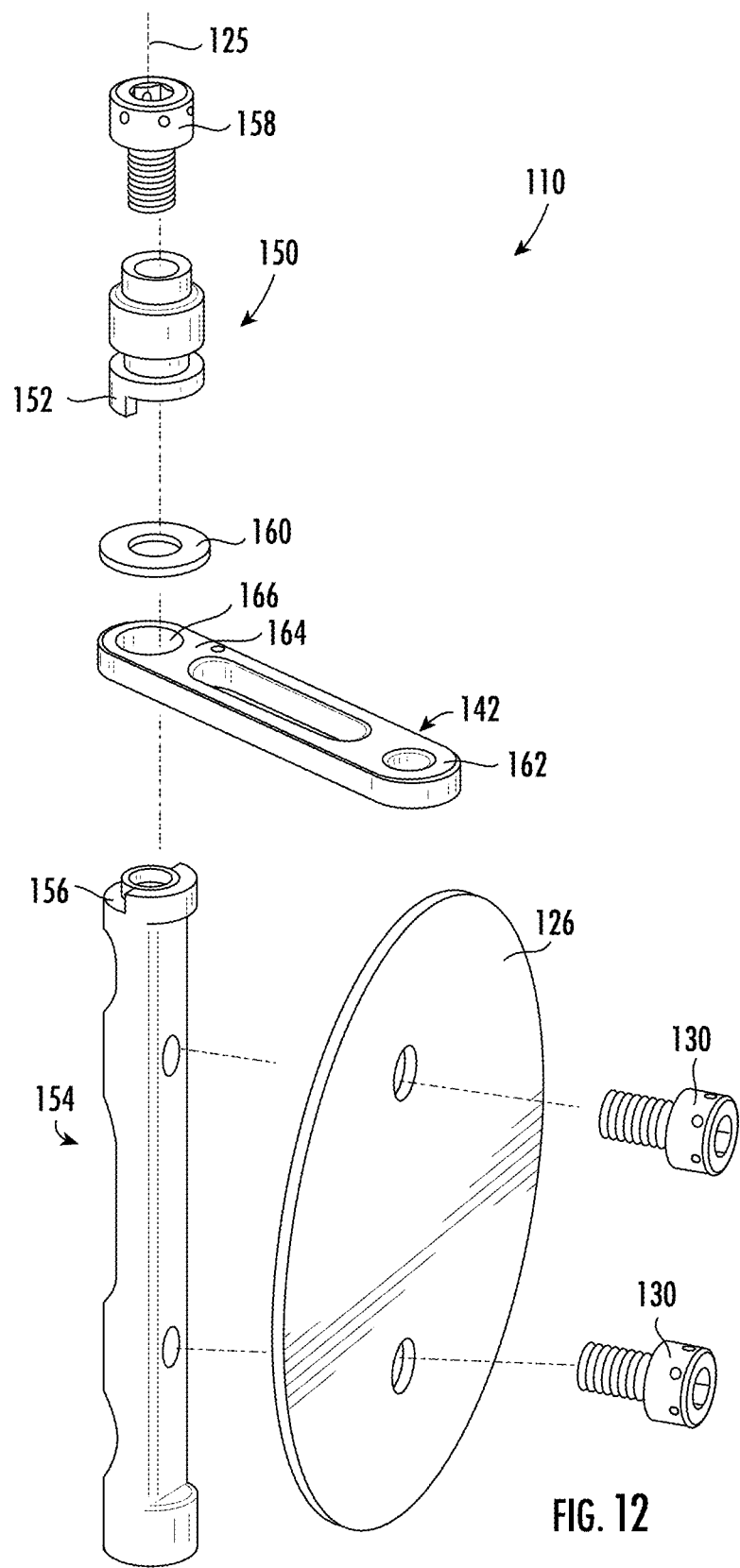
FIG. 12 is an exploded view of the air shut-off valve of FIG. 9, according to an exemplary embodiment.
Figure 13:
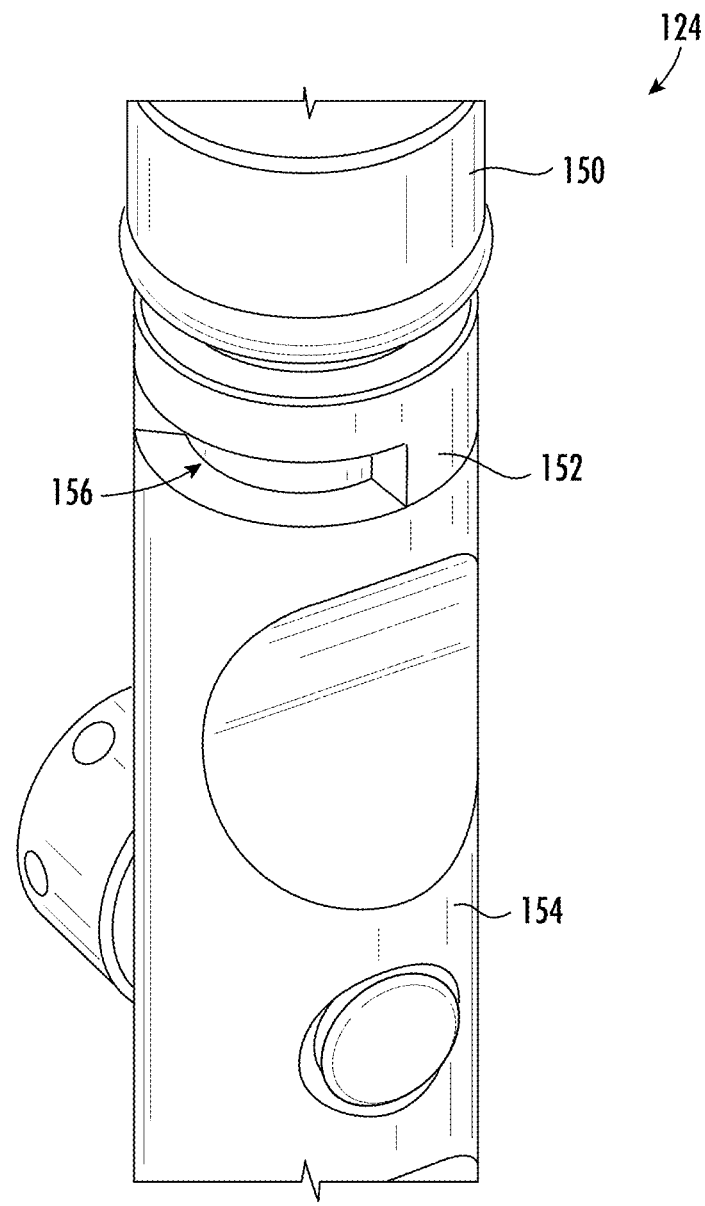
FIG. 13 is a detailed view of the key and keyway of the shaft of the air shut-off valve of FIG. 9, according to an exemplary embodiment.
Figure 14:
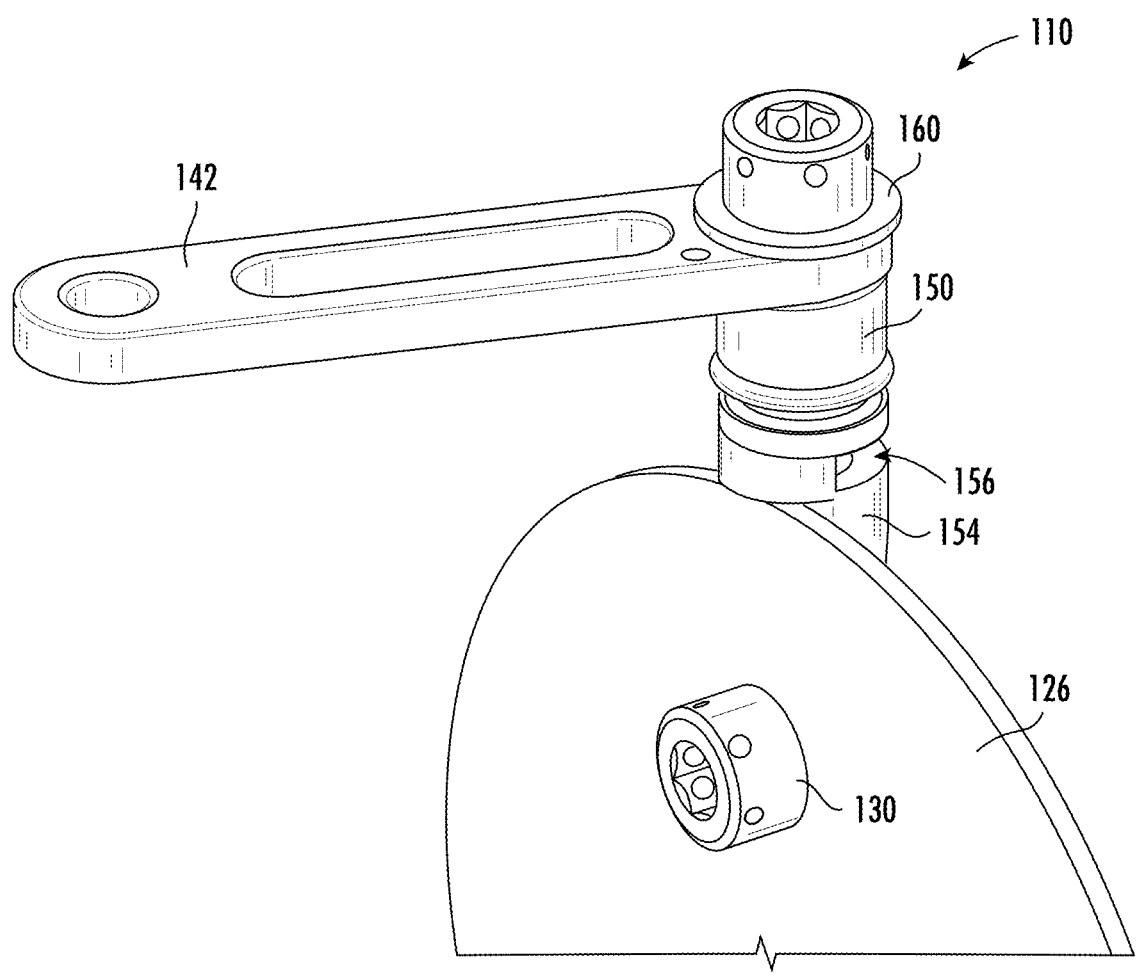
FIG. 14 is a detailed view of the key and the key way of the shaft of the air shut-off valve of FIG. 9 in the opened position, according to an exemplary embodiment.

Referring to FIGS. 8 and 9, valve plate 126 has a diameter 134, which is a width that passes through central axis 127. Diameter 134 is perpendicular to longitudinal axis 125 and to central axis 127. Diameter 134 has two end points 135 located on outer edge 131 of valve plate 126. In a specific embodiment, a shortest distance 136 measured from one of the end points 135 to longitudinal axis 125 is at least 35% of diameter 134 of valve plate 126. More specifically, the shortest distance 136 is at most 45% of diameter 134. In another specific embodiment, the shortest distance 136 measured from an end point 135 to longitudinal axis 125 is between 35% and 45% of diameter 134.

Additionally, as shown, air intake system 102 may include a tab or stopper 140 and a lever 142. Stopper 140 is used to assist valve plate 126 in maintaining the opened position when air flows in the first direction. So, stopper 140 prevents over rotation of valve plate 126 around longitudinal axis 125. Stopper 140 is positioned between shaft and second opening 120. Stopper 140 is shown as a cylindrical protrusion.

Lever 142 is coupled to a top portion of shaft 124. Lever 142 is configured to move valve plate 126 between the opened position and the closed position when a forced is applied to lever 142. Specifically, lever 142 is user actuated and may be coupled to a mechanism which can be engaged by a user to rotate lever 142 around longitudinal axis 125. When lever 142 rotates around longitudinal axis 125, lever 142 rotates shaft 124, which rotates valve plate 126.

Referring to FIGS. 9-15, shaft 124 includes a top section or first section 150 which has a key 152. First section 150 is centered on and extends along longitudinal axis 125. When air shut-off valve 110 is mounted in intake tube 108, first section 150 extends above outer surface 115 and a portion of first section 150 may be retained in projection 128.

Shaft 124 also includes bottom section or second section 154 which has a keyway 156. Second section 154 is rotatably coupled to first section 150. First section 150 and second section 154 are coupled together through a fastener, shown as bolt 158. Second section 154 is centered on and extends along longitudinal axis 125. As such, first section 150 and second section 154 are co-linear with each other, such that first section 150 and second section 154 share a rotational axis. Valve plate 126 is coupled to second section 154 and is configured to rotate between the opened position and the closed position.

Figure 15:
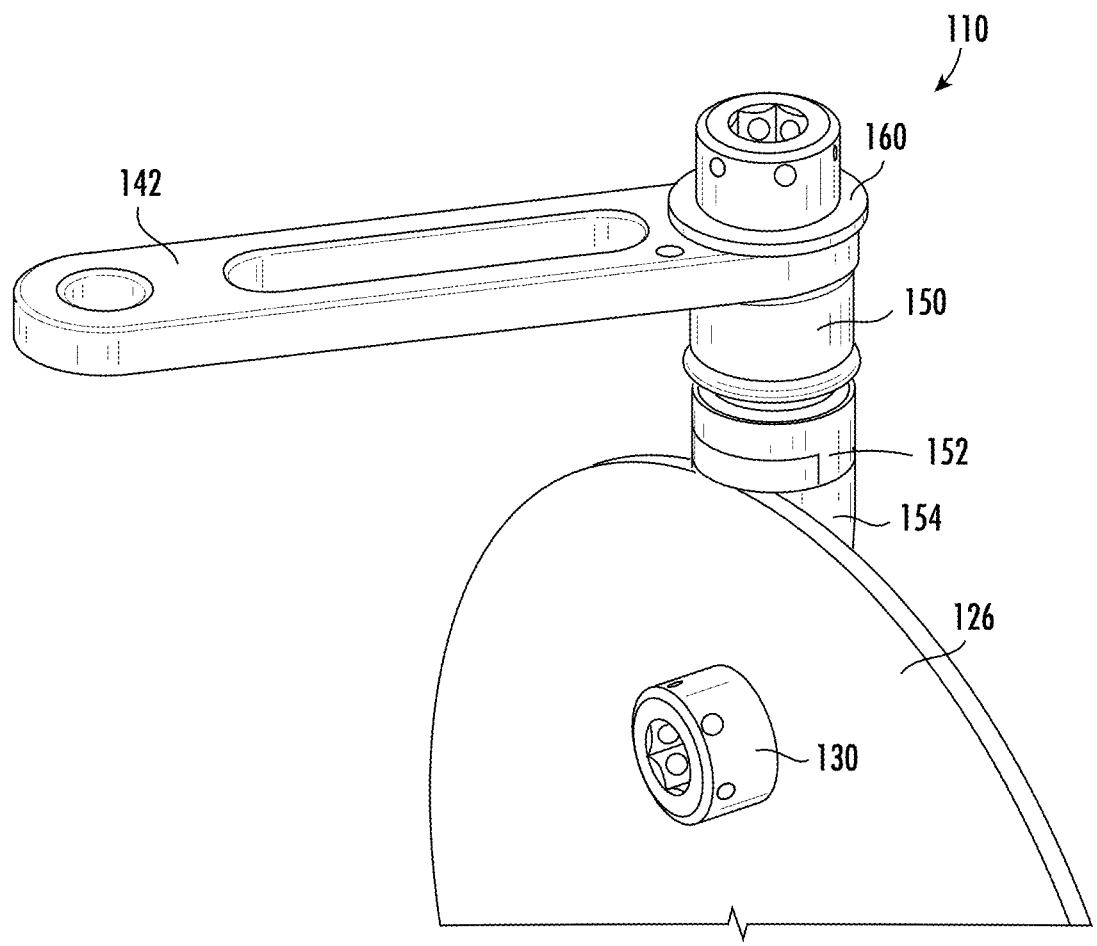
FIG. 15 is a detailed view of the key and the key way of the shaft of the air shut-off valve of FIG. 9 in the closed position, according to an exemplary embodiment.
Figure 16:
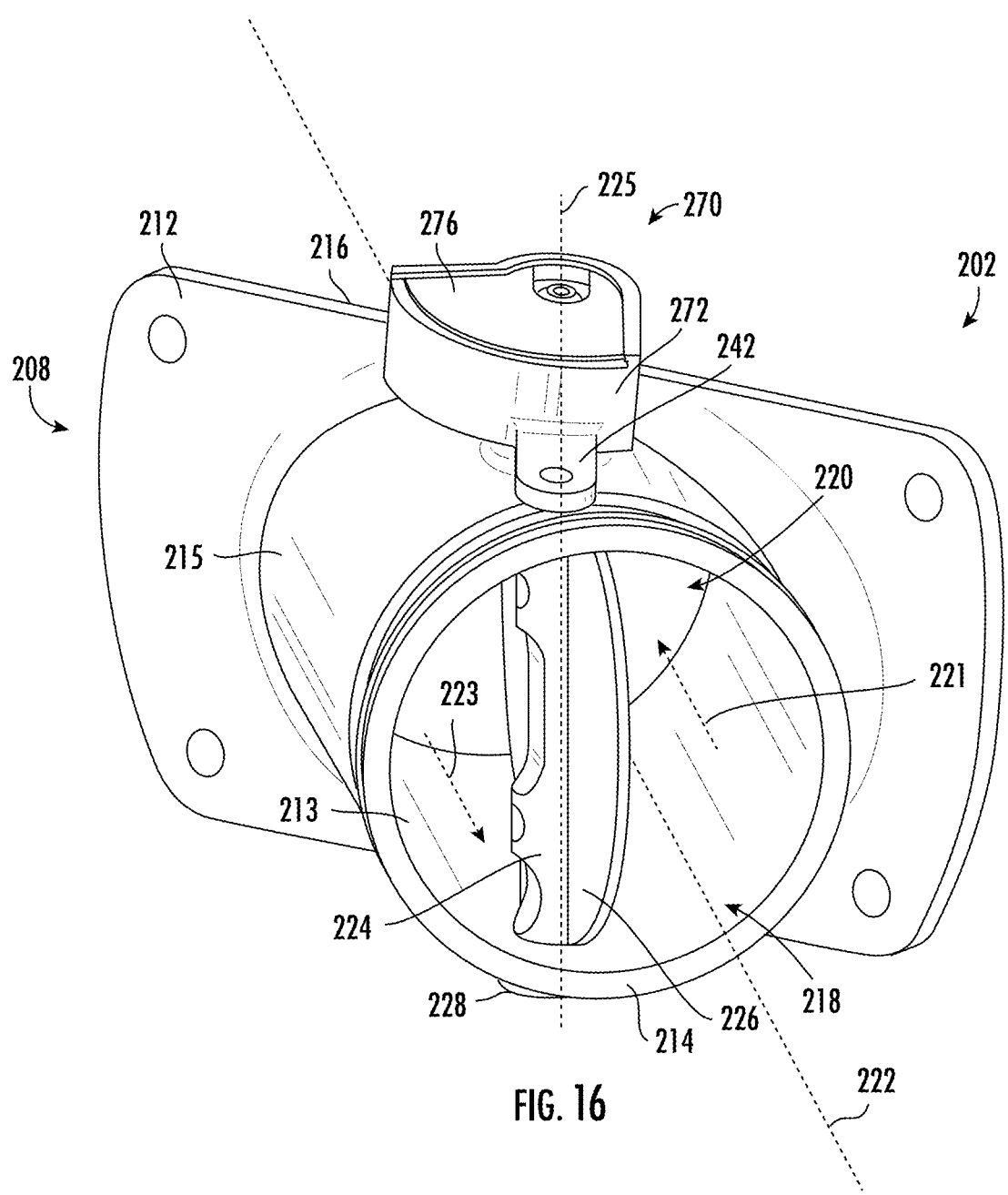
FIG. 16 is a front perspective view of an air intake tube with an air shut off valve in the opened position, according to another exemplary embodiment.
Figure 17:
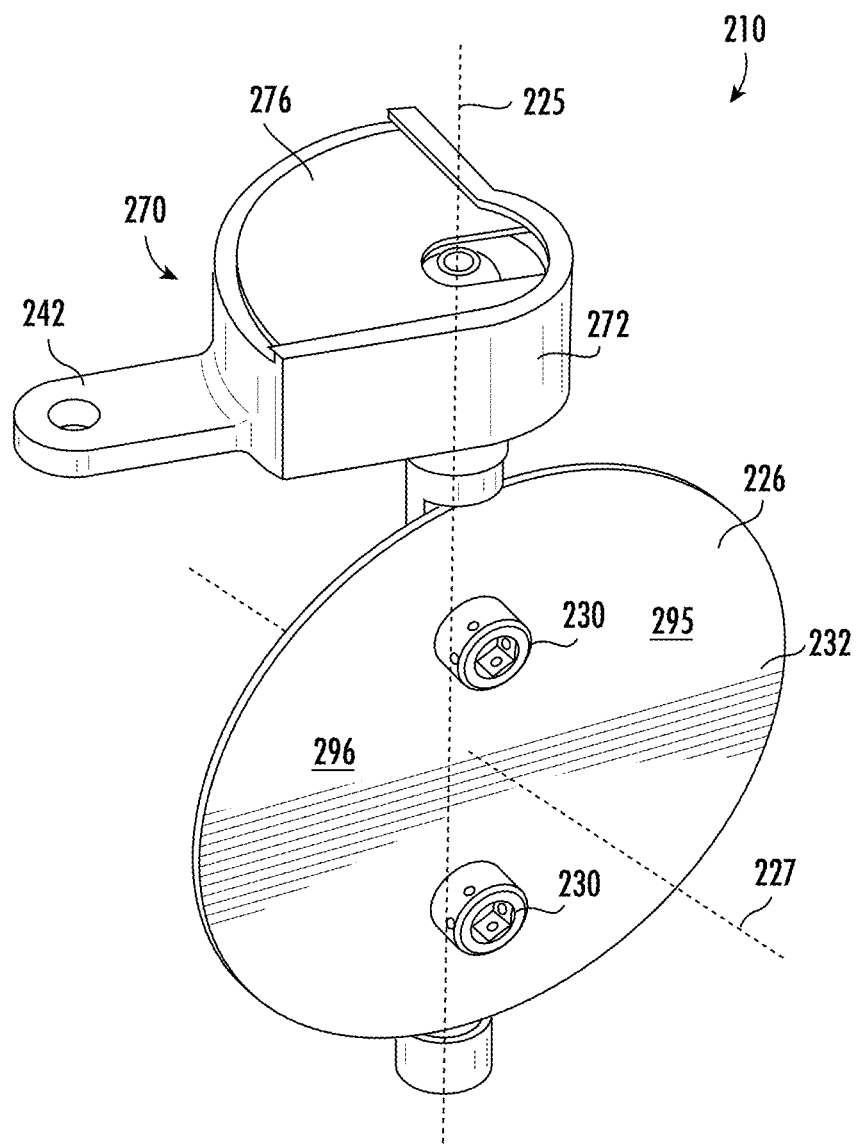
FIG. 17 is a front perspective view of the air shut-off valve of FIG. 16, according to an exemplary embodiment.
Figure 18:
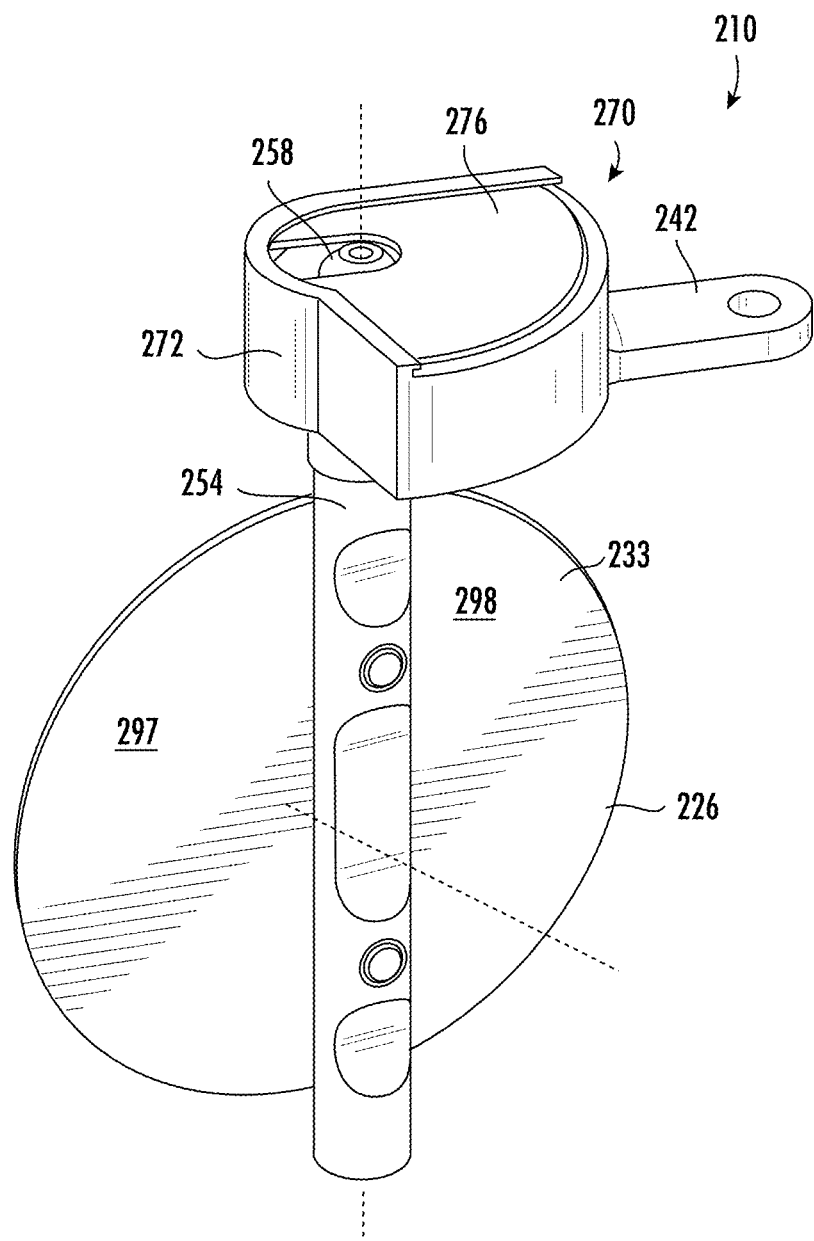
FIG. 18 is a rear perspective view of the air shut-off valve of FIG. 17, according to an exemplary embodiment.
Figure 19:
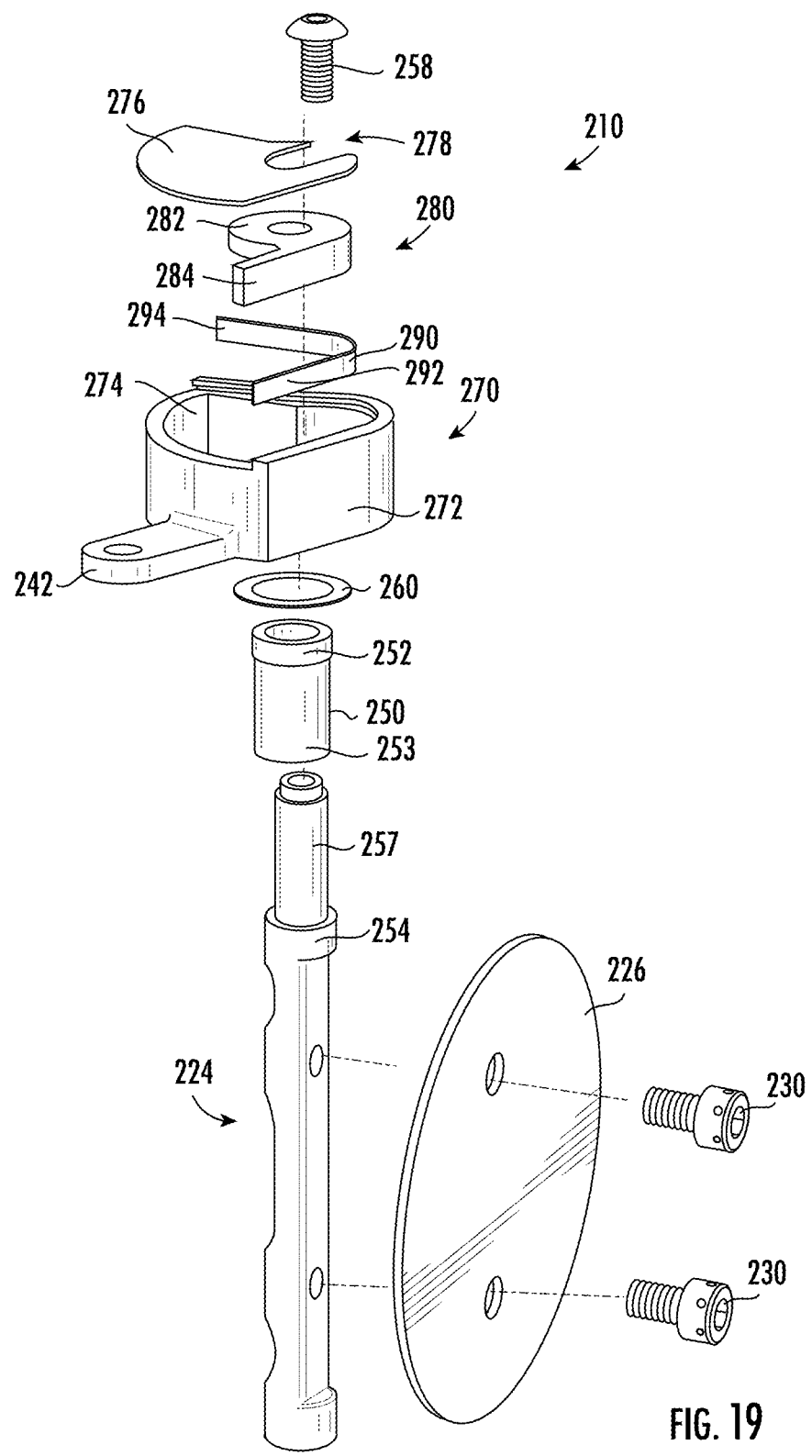
FIG. 19 is an exploded view of the air shut-off valve of FIG. 17, according to an exemplary embodiment.

Key 152 extends radially around first section 150 of shaft 124 a shorter distance than keyway 156 extends radially around second section 154 of shaft 124. When valve plate 126 is actuated into the closed position, key 152 engages keyway 156 retaining valve plate 126 in the closed position. As shown in FIG. 15, key 152 moves into engagement with an edge of keyway 156. As such, first section 150 and second section 154 can rotate around longitudinal axis 125 as long as keyway 156 is not engaged with key 152.

When valve plate is in the opened position, second section 154 can rotate around longitudinal axis 125. In a specific embodiment, when valve plate 126 is in the opened position, second section 154 can rotate around longitudinal axis 125 at least 70 degrees. In another embodiment, second section 154 can rotate around longitudinal axis 125 at most 110 degrees. In a more specific embodiment, second section 154 can rotate around longitudinal axis 125 between 90 degrees and 105 degrees.

Lever 142 is coupled to first section 150 of shaft 124. Lever 142 extends away from shaft 124 in a direction substantially parallel to longitudinal axis 125. Lever 142 includes a first end 162 and a second end 164 opposite first end 162. Second end 164 is configured to coupled to a device to allow a user to manually actuate lever 142. First end 162 has an opening 166 which receives an upper end of first section 150.

Specifically, when a force is applied to lever 142, the lever 142 rotates first section 150 of shaft 124 such that key 152 engages keyway 156 and moves valve plate 126 into the closed position. A washer 160 is provided between bolt 158 and a top surface of lever 142.

Referring to FIGS. 16-23, an air intake system 202 including an air intake tube 208 and an air shut-off valve 210 is shown according to an exemplary embodiment. Air intake system 202 is configured to be used with and to couple to engine 100 and, specifically intake manifold 104. Air intake system 202, air intake tube 208, and air shut-off valve 210 are substantially the same as air intake system 102, air intake tube 108, and air shut-off valve 110 except for the differences discussed herein. Specifically, air intake system 202 includes a housing 270, an arm 280, and a biasing element 290 configured to assist in moving valve plate 226 into the opened position.

Referring to FIGS. 16-19, air shut-off valve 210 is mounted within a body 212 of air intake tube 208. Body 212 extends along an intake axis 222 between a first opening 218 and a second opening 220. Housing 270 is positioned above air intake tube 208 and is configured to rotated with respect to air intake tube 208. Housing 270 is located above an outer surface 215 of body 212 of air intake tube 208. Housing 270 abuts a top surface of a projection 228 extending from outer surface 215. A bearing 260 is positioned between housing 270 and projection 228 to assist housing in rotating with respect to air intake tube 208.

As shown, housing 270 includes an outer wall 272 and an inner wall 274. Housing further includes a top 276. Top 276 is removably coupled to inner wall 274. Top 276 has an opening 278 for a fastener, shown as bolt 258. Bolt 258 is located within housing 270 and top 276 extends above bolt 258.

Air shut-off valve 210 includes a shaft 224 and a valve plate 226. Shaft 224 includes a first section 250 and a second section 254. First section 250 is positioned within housing 270. Specifically, at least a portion of first section 250 is surrounded by housing 270. First section 250 includes a receiving end 252 configured to receive bolt 258. A mounting end 253 opposite receiving end 252 is configured to receive a top portion 257 of second section 254 of shaft 224.

Second section 254 is coupled to first section 250. Second section 254 extends away from first section 250 and housing 270. First section 250 and second section 254 are centered on and extend along longitudinal axis 225. Shaft 224 is positioned with respect to air intake tube 208 such that longitudinal axis 225 and intake axis 222 do not intersect.

Valve plate 226 is mounted on second section 254 through fasteners 230 and is centered on a central axis 227. Valve plate 226 is positioned such that longitudinal axis 225 and central axis 227 do not intersect and are not parallel, and valve plate 226 is positioned such that central axis 227 intersects with intake axis 222.

Valve plate 226 is configured to actuate between an opened position and a closed position by rotating around longitudinal axis 225. First section 250 and second section 254 are fixedly coupled together such that first section 250, second section 254, and valve plate 226 rotate together around longitudinal axis 225.

Shaft 224 further includes an arm 280. Arm 280 is coupled to first section 250 and located within housing 270. Arm 280 includes a rounded end 282 and an elongate projection 284 extending away from rounded end 282. Rounded end 282 is centered on longitudinal axis 225 and is coupled to first section 250 though bolt 258. Bolt 258 extends through rounded end 282 and into receiving end 252 fixedly coupling arm 280 to first section 250. Elongate projection 284 is off-off center from rounded end 282 and extends in a direction perpendicular to longitudinal axis 225.

Biasing element 290 is located within housing 270 and is positioned to engage with arm 280 and inner wall 274 of housing 270. Biasing element 290 is positioned below rounded end 282 of arm 280. A first end 292 abuts elongate projection 284 and interfaces with elongate projection 284. A second end 294 located opposite first end 292 interfaces with inner wall 274 of housing 270.

Biasing element 290 is configured to bias valve plate 226 towards the opened position by applying a force on arm 280. Biasing element 290 assists in retaining valve plate 226 in the opened position unless a sufficient force is applied to the biasing element 290 in the opposite direction. As shown, biasing element 290 is a torsion spring.

Similar to air shut-off valve 110, valve plate 226 of air shut-off valve 210 is divided into four sections by longitudinal axis 225. On a front surface 232 of valve plate 226, valve plate 226 includes a first section 295 on one side of longitudinal axis 225 and a second section 296 located on the opposite side of longitudinal axis 225 from first section 295. On a back surface 233 of valve plate 126, valve plate 226 includes a third section 297 on one side of longitudinal axis 125, and a fourth section 298 located on the opposite side of longitudinal axis 225 from third section 297.

In this way, valve plate 226 is biased into the opened position by air when air flows through intake tube 208 in first direction 221 because more air interfaces with first section 295 of valve plate 226 than on second section 296. Similarly, valve plate 226 is biased into the closed position by air when air flows through intake tube 208 in second direction 223 because more air interfaces with third section 297 of valve plate 226 than on fourth section 298.

Figure 20:
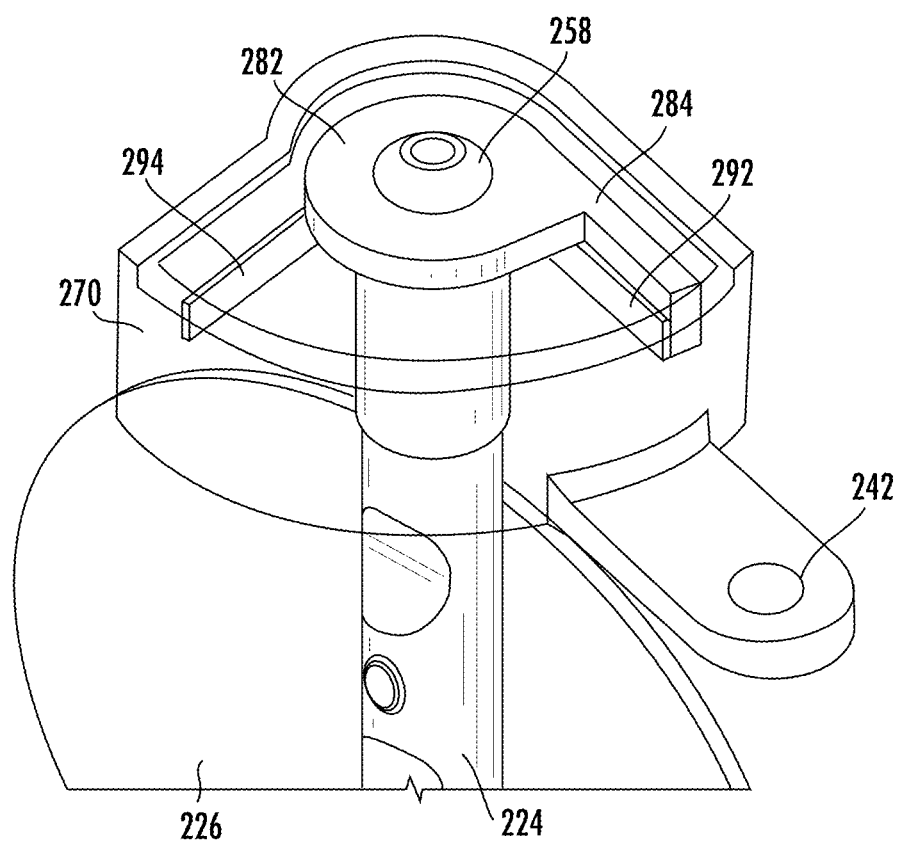
FIG. 20 is a detailed view of the arm, the biasing element, and the housing with transparent walls when the air shut-off valve of FIG. 16 is in the opened position, according to an exemplary embodiment.

Referring to FIG. 20, housing 270, arm 280, and biasing element 290 are shown when the valve plate is in the opened position. When valve plate 226 is in the opened position, elongate projection 284 is adjacent to and extends along inner wall 274 of housing 270. When valve plate 226 is not actuated, biasing element 290 biases valve plate 226 towards the opened position.

Figure 21:
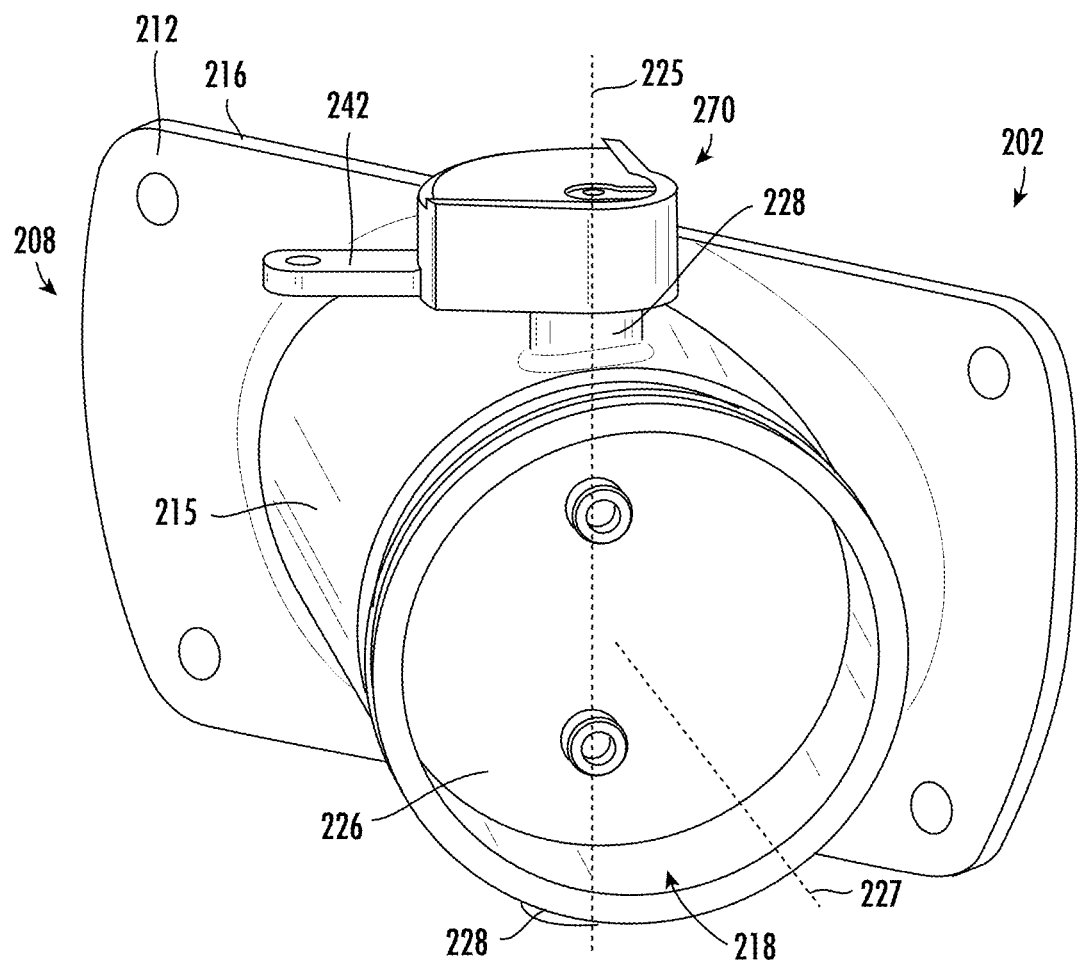
FIG. 21 is a front perspective view of the air intake tube of FIG. 16 with the air shut off valve in the closed position when manually actuated, according to an exemplary embodiment.
Figure 22:
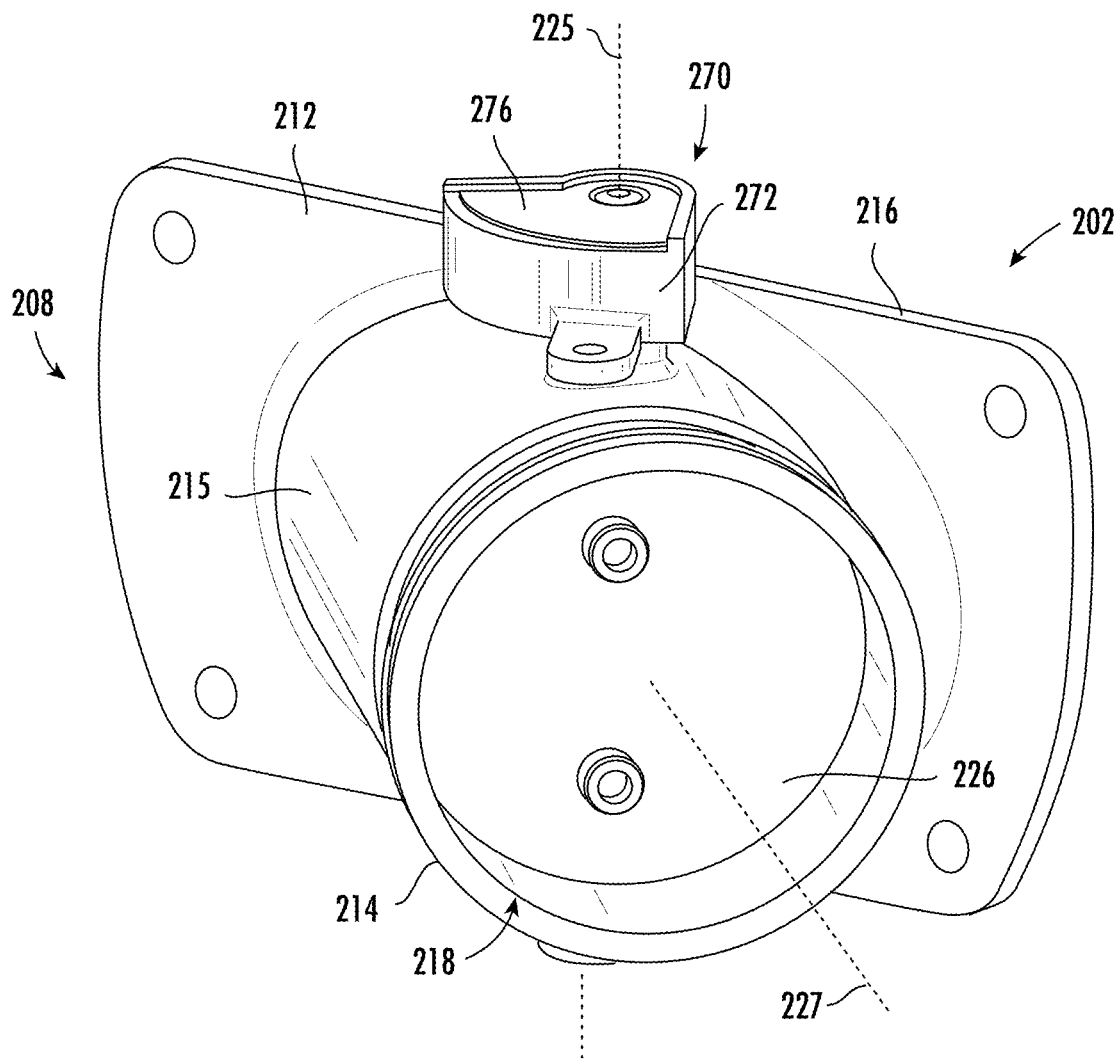
FIG. 22 is a front perspective view of the air intake tube of FIG. 16 with the air shut off valve in the closed position when automatically actuated, according to an exemplary embodiment.
Figure 23:
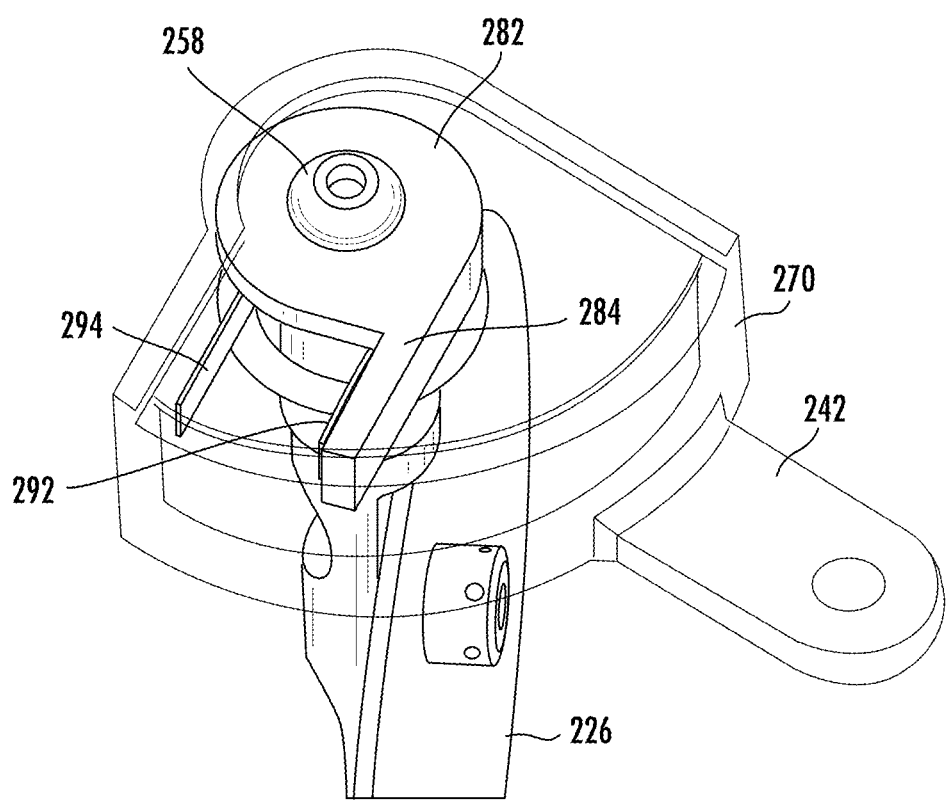
FIG. 23 is a detailed view of the arm, the biasing element, and the housing with transparent walls when the air shut-off valve of FIG. 16 is in the closed position, according to an exemplary embodiment.

Referring to FIGS. 21-23, housing 270, arm 280, and biasing element 290 are shown when valve plate 226 is in the closed position. Housing 270 is shown in two different positions when valve plate 226 is in the closed position. Referring to FIG. 21, housing 270 is shown rotated with respect to air intake tube 208. Housing 270 may be manually rotated to move valve plate into the closed portion.

As shown, a lever 242 is coupled to and extends from housing 270. Lever 242 is configured to couple to a device which allows a user to manually actuate valve plate 226 between the opened and the closed positions. When a forced is applied to lever 242, lever 242 rotates housing 270 with respect to air intake tube 208 such that inner wall 274 of housing 270 engages arm 280 and moves valve plate 226 into the closed position.

Referring to FIGS. 22 and 23, housing 270 does not rotate with respect to air intake tube 208 when valve plate 226 is automatically actuated into the closed position. That is, when air moves in the second direction (i.e., from second opening 220 to first opening 218), valve plate 226 rotates into the closed position, which rotates shaft 224. Shaft 224 rotates arm 280 within housing 270 without rotating housing 270.

As shown, when valve plate 226 is automatically actuated into the closed position, arm 280 applies a force against biasing element 290 which compresses biasing element 290 and brings first end 292 and second end 294 closer together. Once the force is less than a force generated by biasing element 290, biasing element 290 will bias arm 280 towards inner wall 274 of housing 270 and, thus, will bias valve plate 226 towards the opened position.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature. As used herein, "rigidly coupled" refers to two components being coupled in a manner such that the components move together in a fixed positional relationship when acted upon by a force.

In various exemplary embodiments, the relative dimensions, including angles, lengths, and radii, as shown in the Figures are to scale. Actual measurements of the Figures will disclose relative dimensions, angles, and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A compression ignition engine, comprising:
   a manifold;
   a tube centered on and extending along a tube axis, a first opening on the tube, and a second opening on the tube opposite the first opening along the tube axis, the second opening coupled to the manifold and configured to provide fluid communication for air between the first opening and the second opening; and
   an air shut-off valve, comprising:
      a shaft centered on and extending along a longitudinal axis, the longitudinal axis positioned such that the longitudinal axis and the tube axis do not intersect with each other; and
      a valve plate mounted on the shaft and centered on a central axis, the valve plate configured to actuate between an opened position and a closed position with respect to the tube, wherein when in the opened position the central axis intersects the tube axis, and wherein when in the closed position, the central axis is colinear with the tube axis;
   wherein, when air flows through the tube in a first direction, more air interfaces with a first section of the valve plate than a second section of the valve plate to bias the valve plate into the opened position; and
   wherein, when air flows through the tube in a second direction opposite the first direction more air interfaces with a third section of the valve plate than a fourth section to bias the valve plate into the closed position; and wherein, when in the opened position, the valve plate provides greater fluid communication between the first opening and the second opening than when in the closed position.

2. The engine of claim 1, wherein, when in the closed position, the central axis and the longitudinal axis do not intersect with each other.

3. The engine of claim 2, wherein the central axis and longitudinal axis are not parallel to each other.

4. The engine of claim 1, wherein the valve plate has a diameter that is measured perpendicular to the longitudinal axis when the valve plate is in the closed position, and wherein a shortest distance measured from the longitudinal axis to an end point of the diameter located on an outer edge of the valve plate is at most 45% of the diameter of the valve plate.

5. The engine of claim 4, wherein the shortest distance is at least 35% of the diameter of the valve plate.

6. The engine of claim 1, wherein the tube is an intake tube and air flows through the intake tube in the first direction from the first opening through the second opening and into the engine.

7. The engine of claim 1, wherein the tube is an exhaust tube such that the air flows through the exhaust tube in the first direction from the engine through the second opening and out the first opening.

8. The engine of claim 1, wherein the shaft further comprises:
   a first section with a key; and
   a second section with a keyway, the second section rotatably coupled to the first section of the shaft, wherein the valve plate is coupled to the second section of the shaft;
   wherein, when air flows through the tube in the second direction, the key engages with the keyway to bias the valve plate in the closed position.

9. The engine of claim 1, further comprising a housing surrounding a portion of the shaft, and wherein the shaft further comprises:
   a first section having an arm, the arm positioned within the housing;
   a second section extending away from the first section, wherein the valve plate is coupled to the second section of the shaft; and
   a biasing element engaged with the arm and an inner wall of the housing wherein, when the valve plate is not actuated, the biasing element biases the valve plate towards the opened position.

10. The engine of claim 1, further comprising a lever coupled to the shaft, wherein the lever is configured to move the valve plate between the opened position and the closed position when a force is applied to the lever.

11. An air intake system for an engine, comprising:
    an air intake tube comprising:
       a body centered on and extending along an intake axis;
       a first opening on the body; and
       a second opening on the body opposite the first opening along the intake axis, the second opening configured to couple to an engine; and
       a projection extending away from an outer surface of the body;
    an air shut-off valve, comprising:
       a shaft centered on and extending along a longitudinal axis, the shaft comprising:
          a first section with a key, the first section extending through the projection such that a portion of the first section is positioned within the projection;
          a second section with a keyway, the second section rotatably coupled to the first section; and
       a lever coupled to the first section of the shaft and positioned above the projection of the air intake tube; and
       a valve plate mounted on the second section of the shaft and centered on a central axis, the valve plate configured to actuate between an opened position and a closed position with respect to the air intake tube;
    wherein, when the valve plate is in the opened position the central axis and the longitudinal axis of the shaft do not intersect with each other, and when in the closed position, the central axis and the longitudinal axis of the shaft do not intersect with each other;
    wherein, when the valve plate is in the opened position the second section of the shaft can rotate with respect to the first section around the longitudinal axis at least 70 degrees; and
    wherein the lever is configured to move the valve plate between the opened position and the closed position when a force is applied to the lever; and
    wherein, when the valve plate is in the closed position, the key engages the keyway retaining the valve plate in the closed position.

12. The air intake system of claim 11, wherein the valve plate rotates at least 65 degrees between the opened position and the closed position.

13. The air intake system of claim 11, wherein the valve plate rotates less than 90 degrees around the longitudinal axis between the opened position and the closed position.

14. The air intake system of claim 11, wherein the second section can rotate with respect to the first section around the longitudinal axis at most 110 degrees.

15. The air intake system of claim 11, wherein when valve plate is actuated between the opened position and the closed position, the valve plate may rotate with respect to the longitudinal axis when the key is not engaged with an edge of the keyway.

16. An air intake system for an engine, comprising:
    an air intake tube comprising:
       a body centered on and extending along an intake axis;
       a first opening on the body; and
       a second opening on the body opposite the first opening along the intake axis, the second opening configured to couple to an engine; and
    an air shut-off valve, comprising:
       a housing positioned exterior to and above the body of the air intake tube, the housing configured to rotate with respect to the body of the air intake tube;
       a shaft extending along a longitudinal axis, a first section of the shaft positioned within the housing;
       a valve plate mounted on a second section of the shaft, the valve plate centered on a central axis and positioned such that the central axis and the longitudinal axis of the shaft do not intersect with each other, the valve plate configured to actuate between an opened position and a closed position with respect to the air intake tube;
       an arm coupled to the first section of the shaft; and
       a biasing element located within the housing, the biasing element engaged with the arm and an inner wall of the housing, the biasing element configured to bias the valve plate towards the opened position when the valve plate is not actuated.

17. The air intake system of claim 16, wherein the valve plate comprises a first side facing the first opening of the air intake tube, and a second side facing towards the second opening of the air intake tube, wherein when air flow through the air intake tube in a first direction more air interfaces with a first section of the first side of the valve plate than a second section of the first side of the valve plate to bias the valve plate into the opened position.

18. The air intake system of claim 17, wherein when air flow through the air intake tube in a second direction opposite the first direction more air interfaces with a third section of the second side of the valve plate than a fourth section of the second side of the valve plate to bias the valve plate into the closed position.

19. The air intake system of claim 16, wherein the biasing element is a torsion spring.

20. The air intake system of claim 16, wherein the valve plate has a diameter that is perpendicular to the longitudinal axis, and wherein a shortest distance measured from an end point of the diameter located on an outer edge of the valve plate to the longitudinal axis is at most 45% of the diameter of the valve plate.

* * * * *